(12) United States Patent
Torita et al.

(10) Patent No.: US 12,141,772 B2
(45) Date of Patent: Nov. 12, 2024

(54) PROPOSAL SYSTEM AND PROPOSAL METHOD

(71) Applicants: TOYOTA JIDOSHA KABUSHIKI KAISHA, Toyota (JP); KINTO CORPORATION, Nagoya (JP)

(72) Inventors: Mari Torita, Nagoya (JP); Tatsuya Odagawa, Toyota (JP); Yasuyuki Nunokawa, Kasugai (JP); Koji Nishiguchi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 17/740,893

(22) Filed: May 10, 2022

(65) Prior Publication Data
US 2022/0366390 A1   Nov. 17, 2022

(30) Foreign Application Priority Data

May 13, 2021 (JP) ................................. 2021-081547

(51) Int. Cl.
*G06Q 30/00* (2023.01)
*G06Q 20/12* (2012.01)
*G06Q 30/0283* (2023.01)
*G06Q 30/08* (2012.01)

(52) U.S. Cl.
CPC ....... *G06Q 20/127* (2013.01); *G06Q 30/0283* (2013.01); *G06Q 30/08* (2013.01)

(58) Field of Classification Search
CPC ... G06Q 20/127; G06Q 30/0283; G06Q 30/08
See application file for complete search history.

(56) References Cited

U.S. PATENT DOCUMENTS

| 2018/0033030 A1* | 2/2018 | Hansen ............... G06Q 30/0206 |
| 2019/0172128 A1* | 6/2019 | Fisher .................... G06F 16/957 |
| 2021/0118022 A1 | 4/2021 | Balikjian et al. |

FOREIGN PATENT DOCUMENTS

| JP | 2003-044698 A | 2/2003 |
| JP | 2014-523057 A | 9/2014 |
| KR | 102237540 B1 | 4/2021 |
| WO | 2013/016217 A2 | 1/2013 |

OTHER PUBLICATIONS

Perktold, Fabian, and Moritz von Raczeck. "PSS Design in Practice-How a Choice Experiment Can Help Configuring a New Subscription Offer. The Case of Care by Volvo's Used Car Subscription Offer." (2019).*

* cited by examiner

*Primary Examiner* — Kathleen Palavecino
(74) *Attorney, Agent, or Firm* — Sughrue Mion, PLLC

(57) ABSTRACT

A new car subscription service in which a user is entitled to use a new car by periodically paying a first flat-rate fee and a used vehicle subscription service in which a user is entitled to use a used vehicle by periodically paying a second flat-rate fee are provided. A proposal system includes an obtaining unit that obtains information on the first flat-rate fee for a model and a model year identical to those of a used vehicle and a processor that calculates the second flat-rate fee to be lower than the first flat-rate fee.

1 Claim, 18 Drawing Sheets

NEW CAR SERVICE INFORMATION

| VEHICLE ID |
| VEHICLE INFORMATION |
| FLAT-RATE PAYMENT AMOUNT INFORMATION |
| CONTRACT PERIOD |
| CONTRACT START TIMING |
| CONTRACTOR INFORMATION |

| MODEL NAME |
| MODEL YEAR |
| OPTION INFORMATION |
| GRADE INFORMATION |

USED CAR SERVICE INFORMATION

| VEHICLE ID |
|---|
| VEHICLE INFORMATION |
| FLAT-RATE PAYMENT AMOUNT |
| CONTRACT PERIOD |
| CONTRACTOR INFORMATION |

| MODEL NAME |
|---|
| MODEL YEAR |
| VEHICLE RECORD |
| OPTION INFORMATION |
| GRADE INFORMATION |
| RECONDITIONING RECORD INFORMATION |
| ACCIDENT INFORMATION |

PROPOSAL SYSTEM AND PROPOSAL METHOD

This nonprovisional application is based on Japanese Patent Application No. 2021-081547 filed with the Japan Patent Office on May 13, 2021, the entire contents of which are hereby incorporated by reference.

BACKGROUND

Field

The present disclosure relates to a proposal system and a proposal method.

Description of the Background Art

A system or the like that visually presents various types of information such as a trade-in price, a list price, and an expected sales price for a used vehicle has conventionally been proposed (Japanese National Patent Publication No. 2014-523057).

SUMMARY

A method of using a vehicle not only for an auction held by an auction operator and buying and sales by a retailer but also for a subscription service has recently attracted attention as vehicle business.

In this vehicle subscription service, a service provider provides a user with a vehicle that the user is entitled to use, and on the other hand, the service provider receives a flat-rate fee from the user, for example, every month. Many business operators have recently moved in the markets of such a vehicle subscription service.

While a used vehicle subscription service attracts much attention, for the system described in Japanese National Patent Publication No. 2014-523057, how to set a flat-rate fee to be paid by a user in the used vehicle subscription service has not been described.

The present disclosure was made in view of problems as above, and an object thereof is to provide a system and a proposal method that propose a flat-rate fee to be paid by a user in a used vehicle subscription service.

A new car subscription service in which a user is entitled to use a new car by periodically paying a first flat-rate fee and a used vehicle subscription service in which a user is entitled to use a used vehicle by periodically paying a second flat-rate fee are provided. A proposal system according to the present disclosure includes an obtaining unit that obtains information on the first flat-rate fee for a model and a model year identical to those of a used vehicle and a processor that calculates the second flat-rate fee to be lower than the first flat-rate fee.

A new car subscription service in which a user is entitled to use a new car by periodically paying a first flat-rate fee and a used vehicle subscription service in which a user is entitled to use a used vehicle by periodically paying a second flat-rate fee are provided. A proposal method according to the present disclosure includes obtaining information on the first flat-rate fee for a model identical to a model of the used vehicle from a server in which information on the new car subscription service is stored and calculating the second flat-rate fee to be lower than the first flat-rate fee.

According to the proposal system and the proposal method, the processor sets a difference between the second flat-rate fee and the first flat-rate fee to be smaller as an amount of decrease which is decrease of a residual value of the used vehicle with lapse of time is smaller.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
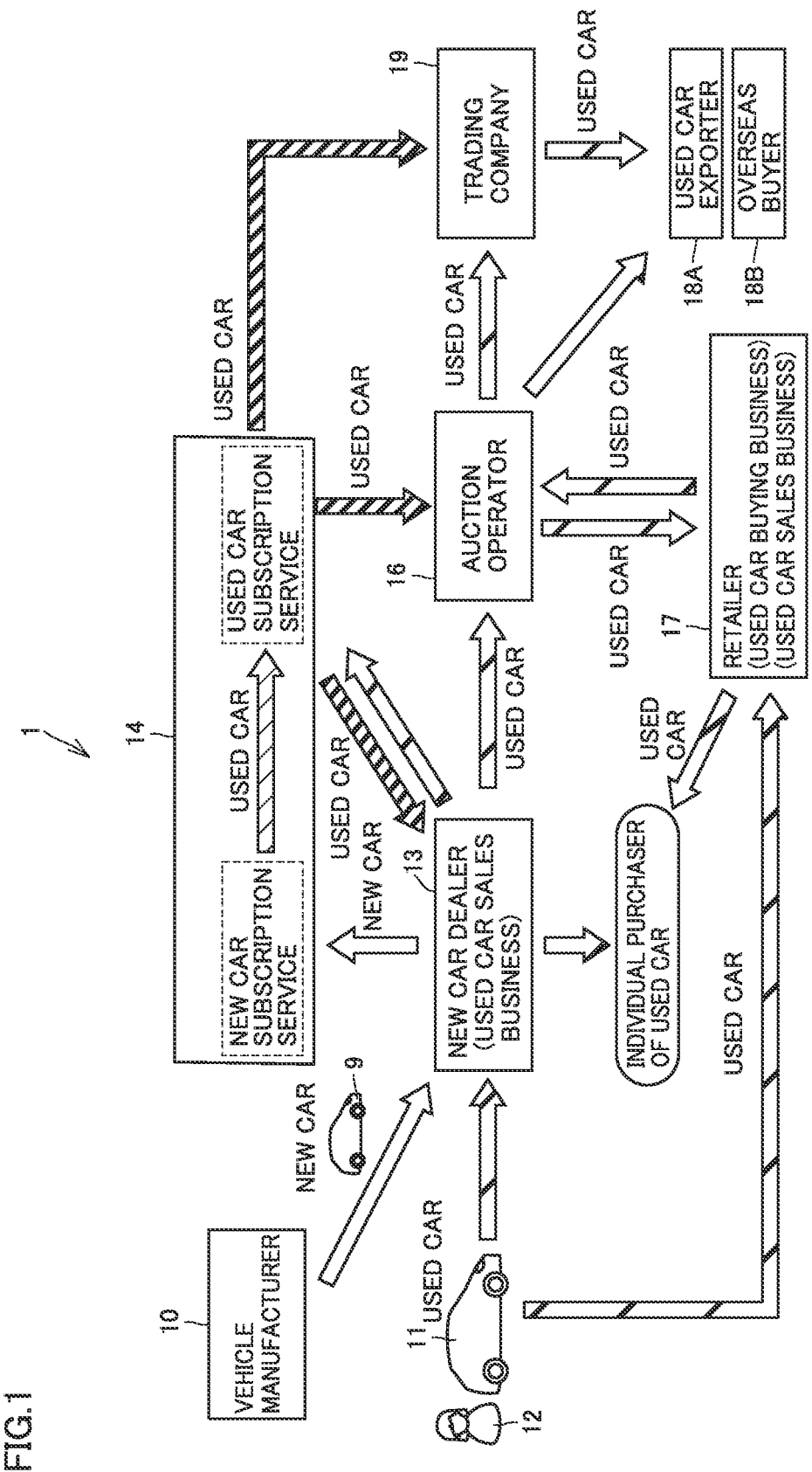
FIG. 1 is a schematic diagram schematically showing a business network 1 for a new car and a used vehicle.

A proposal system according to the present embodiment will be described with reference to FIGS. 1 to 29. Identical or substantially identical features of features shown in FIGS. 1 to 29 have identical reference characters allotted and redundant description is not provided.

First Embodiment

FIG. 1 is a schematic diagram schematically showing a business network 1 for a new car and a used vehicle. In an example shown in this FIG. 1, business network 1 includes a vehicle manufacturer 10 of new cars 9, an owner 12 of a used vehicle 11, a new car dealer 13, a service provider 14, an auction operator 16, a retailer 17, a used car exporter 18A, an overseas buyer 18B, and a trading company 19.

Vehicle manufacturer 10 manufactures new cars 9. New car dealer 13 runs new car sales business and used vehicle sales business. In the new car sales business, new car dealer 13 concludes, for example, an exclusive dealer contract with vehicle manufacturer 10, purchases new cars 9 from vehicle manufacturer 10, and sells new cars 9.

In the used car sales business, new car dealer 13 accepts trade-in of used vehicle 11 owned by owner 12. Then, the new car dealer sells the used vehicle accepted as trade-in to an individual purchaser of the used vehicle or puts up the used vehicle for an auction held by auction operator 16. In addition, new car dealer 13 sells used cars to service provider 14.

Service provider 14 runs new car subscription service business and used vehicle subscription service business.

The new car subscription service is a service to provide to a user, a new car that the user is entitled to use during a contract period by periodically receiving a flat-rate fee from the user.

The used vehicle subscription service is a service to provide to a user, a used vehicle that the user is entitled to use during a contract period by periodically receiving a flat-rate fee from the user.

Service provider 14 purchases new cars from new car dealer 13 and uses them for the new car subscription service. Service provider 14 uses for the used vehicle subscription service, used vehicles purchased from new car dealer 13 and used vehicles that were used in the new car subscription service.

For example, service provider 14 sells used vehicles that were used in the subscription service to trading company 19 or to new car dealer 13, or puts them up for an auction held by auction operator 16.

Auction operator 16 runs auction business between a selling member who sells a used vehicle and a bidding member who makes a bid for a used vehicle. Examples of the selling member include new car dealer, 13 service provider 14, and retailer 17.

Examples of the bidding member include retailer 17, used car exporter 18A, and overseas buyer 18B.

Retailer 17 runs used vehicle buying business and used vehicle sales business. In the buying business, retailer 17 procures used vehicles by buying used vehicle 11 from owner 12 or buying used vehicles at an auction held by auction operator 16.

In the used car sales business, retailer 17 sells the procured used vehicle to an individual purchaser or puts the used vehicle up for an auction held by auction operator 16.

Trading company 19 procures a used vehicle by buying a used vehicle at an auction held by auction operator 16 or by buying a used vehicle from service provider 14. Trading company 19 sells a used vehicle to used car exporter 18A or overseas buyer 18B.

Figures 2, 3:
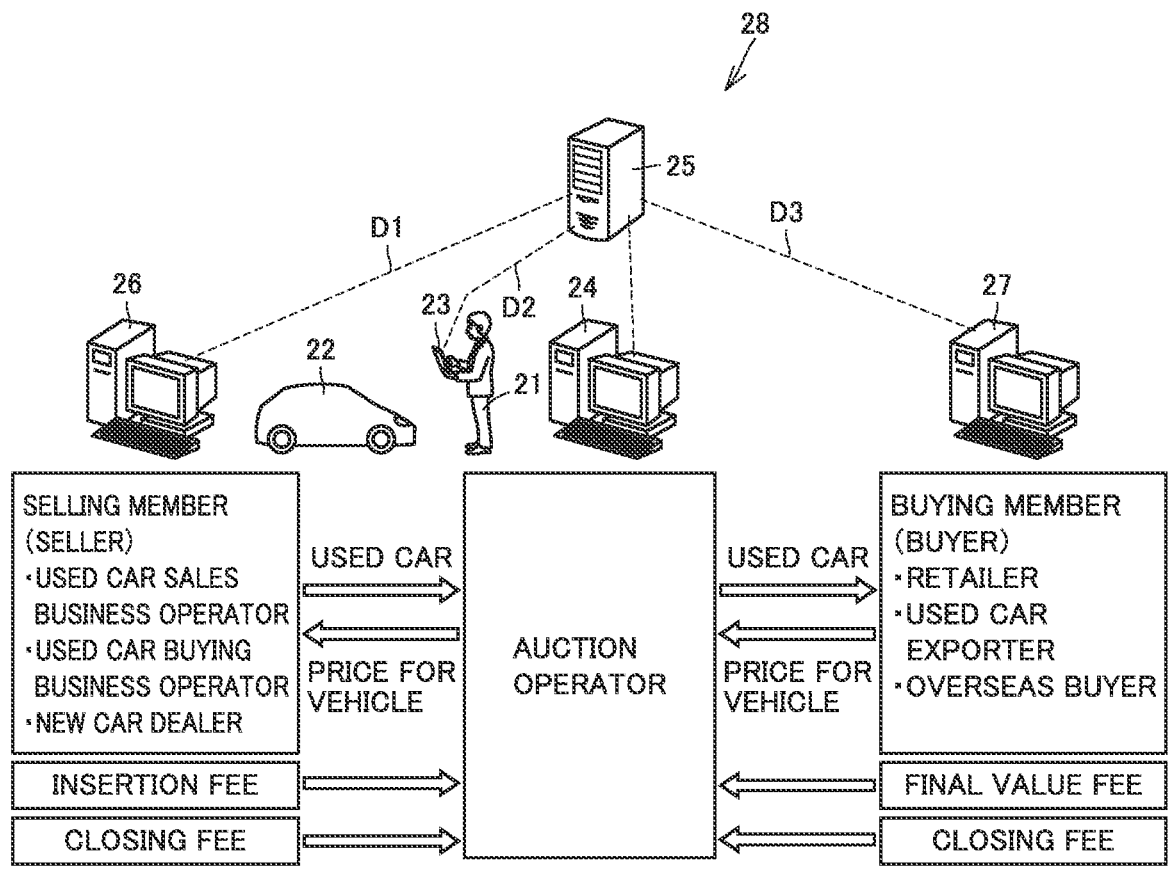
FIG. 2 is a schematic diagram schematically showing an auction system 28 of an auction operator 16.
FIG. 3 is a schematic diagram schematically showing auction information.

FIG. 2 is a schematic diagram schematically showing an auction system 28 of auction operator 16. Auction system 28 includes an inspection terminal 23, an auction terminal 24, a server 25, a seller terminal 26, and a bidding terminal 27.

Seller terminal 26 is a terminal used by a selling member. The selling member enters input information D1 into seller terminal 26. Input information D1 includes vehicle information on a used vehicle to be put up for an auction, a knockdown price of the selling member, and information on the selling member. The knockdown price refers to a minimum contract price desired by the selling member.

Seller terminal 26 transmits entered input information D1 to server 25.

Auction operator 16 subjects a used vehicle 22 brought to an auction venue to vehicle inspection by an inspector 21. Inspector 21 inspects used vehicle 22 and enters inspection information into seller terminal 26, and seller terminal 26 transmits inspection information D2 to server 25. Inspection information D2 includes vehicle information of the used vehicle put up for the auction and a vehicle ID for identifying used vehicle 22. The vehicle information includes a model name, a model year, a vehicle record, and information on damage of used vehicle 22 put up for the auction. The vehicle information further includes also option information and grade information of used vehicle 22. The vehicle record includes repair record information, accident record information, information on a travel distance, and the like.

Bidding terminal 27 is a terminal used by a bidding member. The bidding member can use bidding terminal 27 to view a list of cars put up for the auction on that day and vehicle information of each car put up for the auction. Then, the bidding member can use bidding terminal 27 to participate in the auction of used vehicles.

The bidding member can specify a used vehicle that is being auctioned and raise a bid price. Bidding terminal 27 transmits bid information D3 to server 25. Bid information D3 includes a vehicle ID for identifying a used vehicle specified by the bidding member, information representing a bid price, and information identifying a bidding member who has made a bid.

Auction terminal 24 obtains a knockdown price (minimum contract price) of the selling member who is participating in the auction and a bid price from server 25, and stops and closes the bid at a time point when the auctioned vehicle has fetched the knockdown price set by a seller or a highest value over the knockdown price. Auction terminal 24 transmits a contract price, a vehicle ID for identifying a used vehicle, and information identifying the bidding member who has made a successful bid to server 25.

Auction information representing the vehicle information of the bought used vehicle, the contract price, and time and date of the successful bid is stored in server 25. FIG. 3 is a schematic diagram schematically showing auction information. The vehicle information in the auction information includes a model name, a model year, a vehicle record, damage information, option information, and grade information of the vehicle.

In FIG. 2, the bidding member who has made a successful bid for the used vehicle pays a final value fee and a closing fee to auction operator 16, and pays for the vehicle to the selling member via auction operator 16.

The selling member who has put the used car up for the auction pays an insertion fee and a closing fee to auction operator 16 and receives the price for the vehicle via auction operator 16.

Figure 4:
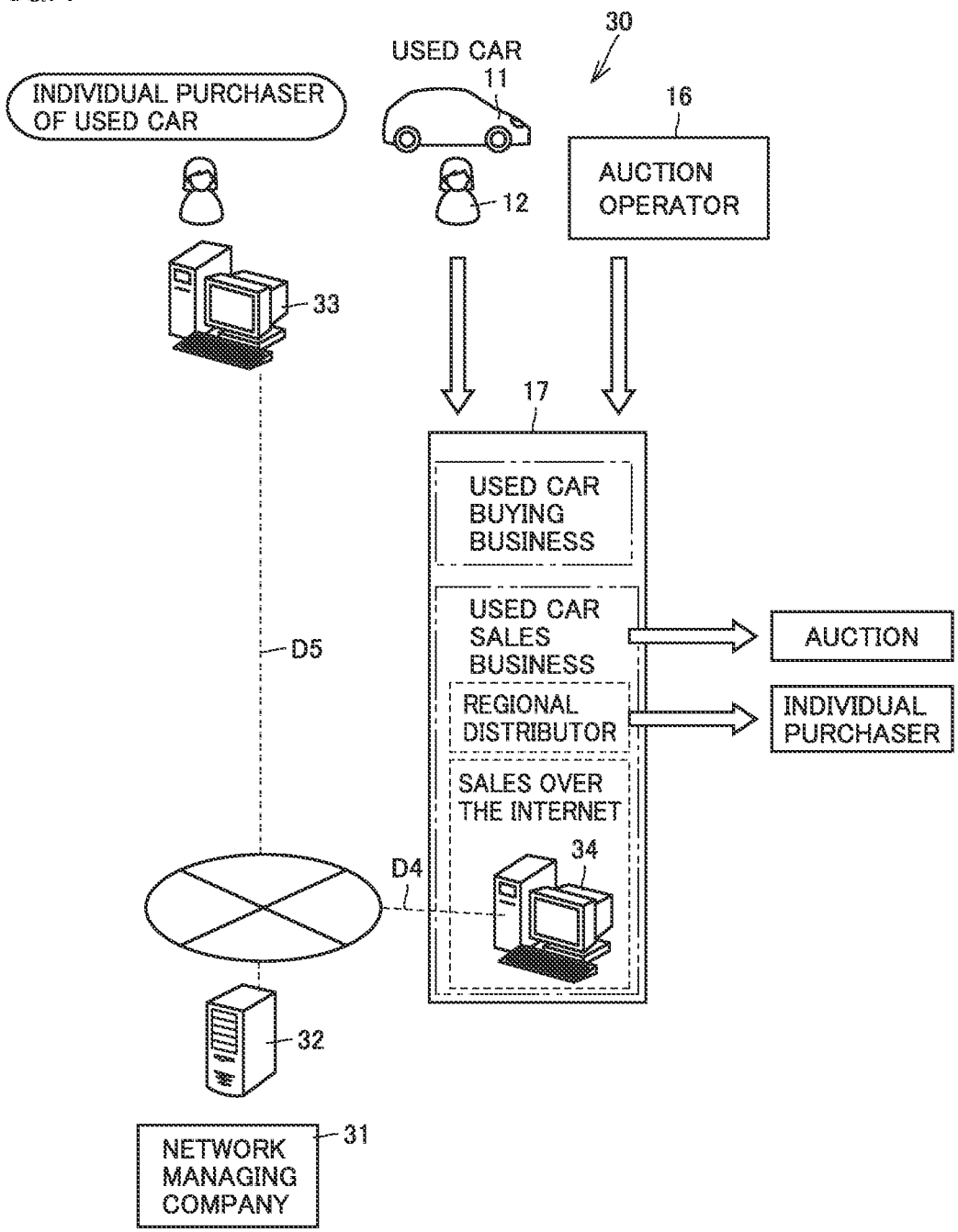
FIG. 4 is a schematic diagram schematically showing a retail system 30 of a retailer 17.

FIG. 4 is a schematic diagram schematically showing a retail system 30 of retailer 17. Retailer 17 purchases a used vehicle from owner 12 of used vehicle 11 or at an auction. Retailer 17 sells the purchased used vehicle to an individual consumer at a distributor or to an individual consumer through the Internet, or puts the purchased used vehicle up for an auction held by auction operator 16.

Retail system 30 is a system that introduces and advertises vehicles sold by retailer 17. Retail system 30 is operated and managed by a network managing company 31.

Retail system 30 includes a server 32 and a retail terminal 34. Retail terminal 34 is a terminal used by retailer 17. Retailer 17 enters input information D4 into retail terminal 34 and retail terminal 34 transmits input information D4 to server 32. Input information D4 includes a photograph of a used vehicle listed on the web, a list price, and vehicle information of the used vehicle. The vehicle information includes a model name, a model year, option information, grade information, reconditioning record information, and travel distance information. Retailer 17 can change the list price of the used vehicle with the use of retail terminal 34.

A user can access server 32 through a user's own terminal 33. Then, an individual consumer can view the photograph of the used vehicle listed on the web, a selling price, and the vehicle information.

The user can identify a used vehicle in which the user is interested, enter user information, and make an inquiry about the used vehicle by using terminal 33. For example, the user can enter questions in an inquiry form shown on terminal 33. The user information includes a contact address and the like of the user.

Terminal 33 transmits inquiry information D5 to server 32. Inquiry information D5 includes a vehicle ID indicating an identified used vehicle, inquiry information, and user information. Server 32 transmits inquiry information D5 to retail terminal 34.

Figure 5:
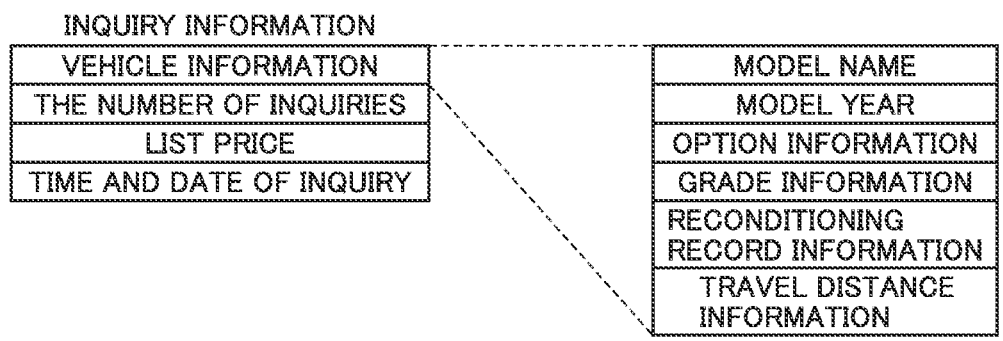
FIG. 5 is a schematic diagram schematically showing inquiry information.

Then, inquiry information is stored in server 32. FIG. 5 is a schematic diagram schematically showing inquiry information. The inquiry information includes vehicle information on a listed used vehicle, information representing the number of inquiries, information representing the list price, and information representing time and date of the inquiry. The vehicle information includes, for example, a model name, a model year, option information, grade information, reconditioning record information, travel distance information, and the like. When the selling price is changed, information representing the number of inquiries and information representing time and date of inquiry are stored for each selling price.

Figure 6:
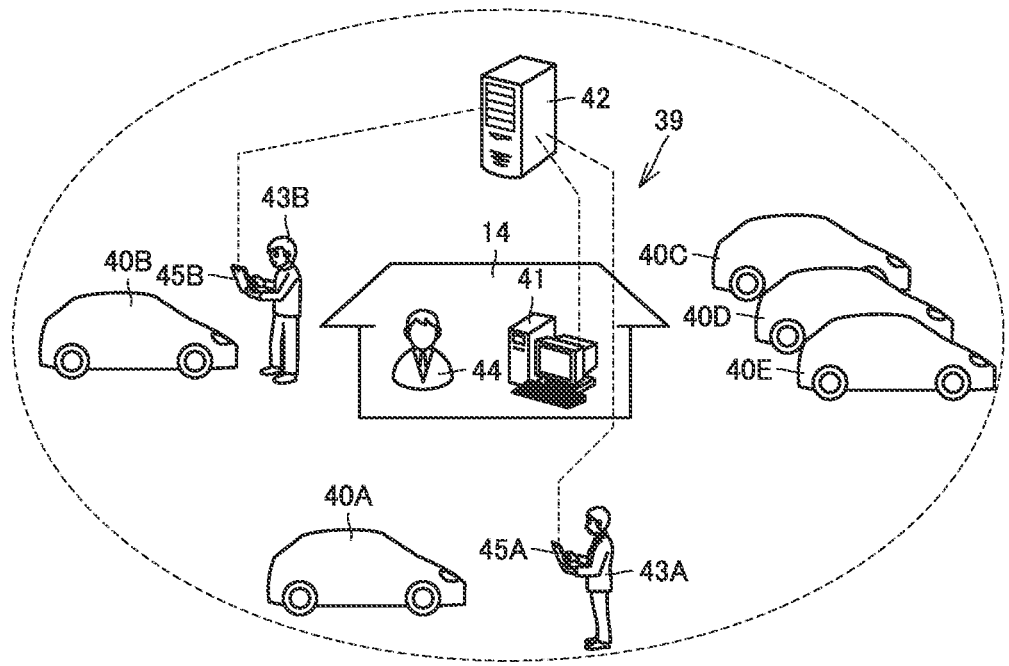
FIG. 6 is a schematic diagram schematically showing a system 39 for providing a new car subscription service.

FIG. 6 is a schematic diagram schematically showing a system 39 for providing a new car subscription service.

Service provider 14 purchases a plurality of vehicles 40A to 40E from new car dealer 13. Vehicles 40A to 40E are new cars. Vehicles 40A to 40E include vehicles of a plurality of models.

For example, service provider 14 provides to a user 43A, vehicle 40A that user 43A is entitled to use during a contract period. Then, service provider 14 periodically receives a flat-rate fee from user 43A. For example, in this new car subscription service, user 43A does not have to pay a maintenance cost, a troubleshooting cost, an insurance cost, and various tax expenses in connection with vehicle 40A.

Therefore, user 43A is entitled to use vehicle 40A for a contract period (for example, three years) by paying the flat-rate fee to service provider 14 every month for the contract period. In the present embodiment, the flat-rate fee is determined, for example, based on the model.

System 39 includes a business operator terminal 41, a server 42, and user terminals 45A and 45B. Business operator terminal 41 is a terminal used by a person in charge 44 of service provider 14. User terminals 45A and 45B are terminals used by respective users 43A and 43B, and they are, for example, smartphones. Business operator terminal 41 and user terminals 45A and 45B are connected to server 42 through the Internet.

Person in charge 44 enters vehicle information of vehicles 40A to 40E into business operator terminal 41 and business operator terminal 41 transmits the entered vehicle information to server 42.

For example, when user 43A applies for use of vehicle 40A, the user uses user terminal 45A to access a web site on server 42. User 43A enters various types of information in an entry form shown on a screen of user terminal 45A. For example, user 43A enters selection of a shop, selection of a model, a grade, and an option of a vehicle to be used, selection of a contract period, and various types of information such as a name and a contact address of the user.

User terminal 45A transmits the entered various types of information to server 42. Server 42 has the various types of information received from user terminal 45A stored in a storage and transmits the information to business operator terminal 41. Person in charge 44 conducts examination based on the received various types of information.

When person in charge 44 sees no problem as a result of examination, person in charge 44 enters completion of the examination into business operator terminal 41. Business operator terminal 41 transmits a notification of completion of the examination to server 42, and server 42 transmits the notification of completion of examination to user terminal 45A. When user terminal 45A receives the notification of completion of examination and user 43A presses a contract application button embedded in the notification of completion of the examination, a contract is made. When the contract application button is pressed, user terminal 45A transmits a notification of conclusion of the contract to server 42, and server 42 transmits the notification of conclusion of contract to business operator terminal 41. Thereafter, as user 43A receives vehicle 40A at the selected shop, the user can use vehicle 40A.

Figures 7, 8:
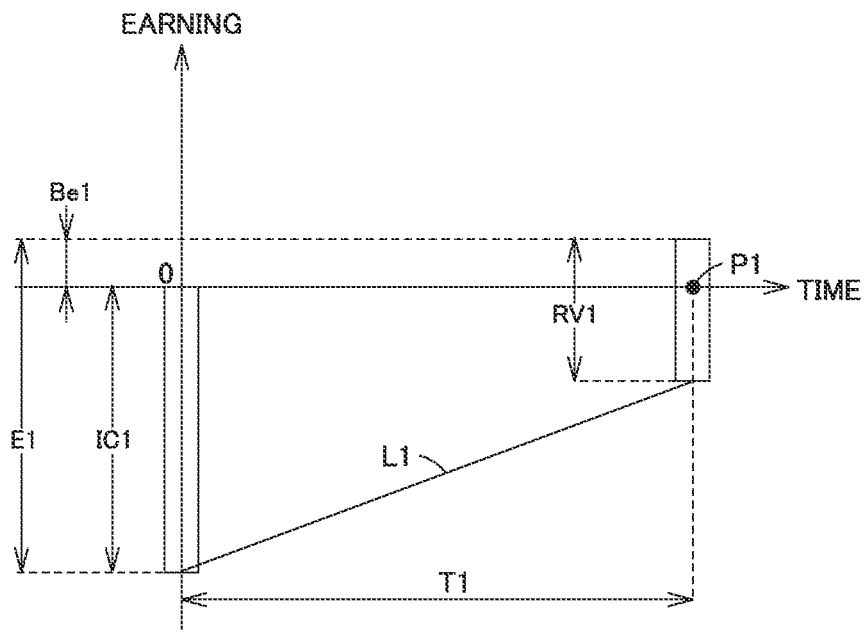
FIG. 7 is a schematic diagram schematically showing new car service information.
FIG. 8 shows a graph schematically showing an earnings structure of the subscription service for a vehicle 40A.

New car service information is thus stored in server 42. FIG. 7 is a schematic diagram schematically showing new car service information.

The new car service information is stored for each of vehicles 40A to 40E. The new car service information includes a vehicle ID, vehicle information, flat-rate payment amount information, a contract period, contract start timing, and contractor information. The vehicle ID is set for each of vehicles 40A to 40E. Vehicle information includes each model name, a model year, a vehicle record, option information, and grade information.

When the contract period expires, user 43A returns vehicle 40A to service provider 14. Then, when vehicle 40A has been damaged, service provider 14 repairs vehicle 40A. Person in charge 44 enters repair information into business operator terminal 41 and business operator terminal 41 transmits the repair information to server 42. Then, the repair information is added to the new car service information stored in server 42. When there is an accident record for vehicle 40A, person in charge 44 enters accident information into business operator terminal 41 and the accident information is stored in the new car service information.

FIG. 8 shows a graph schematically showing an earnings structure of the subscription service for vehicle 40A. The ordinate in the graph represents earnings and the abscissa represents time. The origin "0" in the graph represents timing of start of the contract. "P1" in the graph represents timing of end of the contract and "T1" represents the contract period.

"IC1" in the graph represents an initial cost paid by service provider 14 when it provides the subscription service using vehicle 40A. Initial cost IC1 includes, for example, a vehicle price of vehicle 40A, a voluntary insurance cost for vehicle 40A, an expected repair and maintenance cost, and various taxes.

"L1" in the graph represents a condition line schematically showing an earnings state. An initial value of condition line L1 is set to initial cost IC1. Since user 43A monthly pays the flat-rate fee to service provider 14, condition line L1 increases with lapse of time. "RV1" in the graph represents a residual value of vehicle 40A at the time of contract expiration P1. Residual value RV1 represents a profit obtained when a vehicle is sold at an auction held by auction operator 16 or sold to retailer 17 at the time of contract expiration P1.

"E1" represents sales in the subscription service of vehicle 40A and it is a sum of a total amount of flat-rate fees paid by the user and residual value RV1. Sales E1 represents an amount determined in advance by service provider 14. In other words, residual value RV1 is expected in advance and a flat-rate fee FR1 for the new car subscription service is set such that sales E1 attains to a predetermined amount. "Be1" represents a value calculated by subtracting initial cost IC1 from sales E1 and can be expressed in an expression (1) below.

$$\text{Profit } Be1 = \text{Sales } E1 - \text{Initial Cost } IC1 \qquad (1)$$

The example shown in FIG. 8 shows the earnings structure of the subscription service of vehicle 40A. When a new car is different in model from vehicle 40A, initial cost IC1, an inclination of condition line L1, and residual value RV1 are different.

Figures 9, 10:
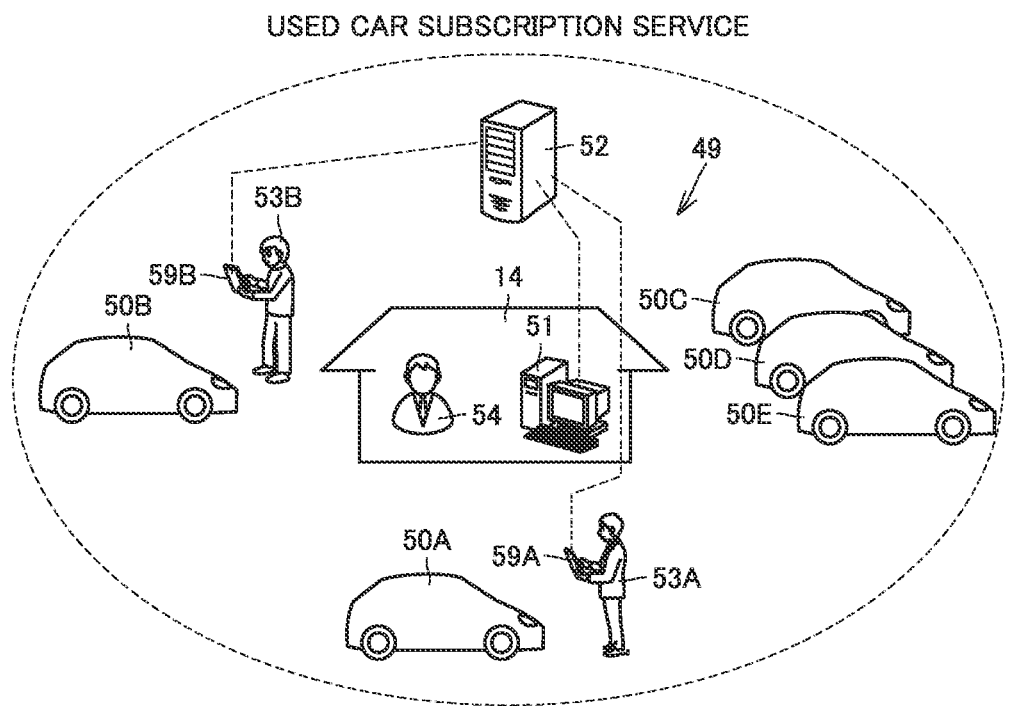
FIG. 9 is a schematic diagram schematically showing a system 49 for providing a used vehicle subscription service.
FIG. 10 is a schematic diagram schematically showing used vehicle service information.

FIG. 9 is a schematic diagram schematically showing a system 49 for providing a used vehicle subscription service. Service provider 14 procures used vehicles 50A to 50E.

A vehicle used in the new car subscription service may be used as used vehicles 50A to 50E. A vehicle may be procured at an auction, or a used vehicle accepted as trade-in by new car dealer 13 may be purchased from new car dealer 13. A plurality of models are included in used vehicles 50A to 50E.

Service provider 14 provides to a user 53A, used vehicle 50A that user 53A is entitled to use for a contract period. Then, service provider 14 periodically receives the flat-rate fee from user 53A. In the used vehicle subscription service, user 53A does not have to pay a maintenance cost, a troubleshooting cost, an insurance cost, and various tax expenses in connection with used vehicle 50A.

System 49 includes a business operator terminal 51, a server 52, and user terminals 59A and 59B. Business operator terminal 51 is a terminal used by a person in charge 54. User terminals 59A and 59B are terminals used by respective users 53A and 53B, and they are, for example, smartphones.

Business operator terminal 51 and user terminals 59A and 59B are configured to communicate with server 52 through the Internet. Server 52 is configured to communicate with server 42 shown in FIG. 6.

When service provider 14 uses in the used vehicle subscription service, vehicle 40A or the like that was used in the new car subscription service, server 52 obtains various types of information on vehicle 40A from server 42.

When service provider 14 purchases a used vehicle from new car dealer 13 for the used vehicle subscription service, for example, person in charge 54 enters vehicle information of used vehicles 50A to 50E into business operator terminal 51. Business operator terminal 51 transmits entered vehicle information of used vehicles 50A to 50E to server 52. The server of new car dealer 13 and server 52 may be configured to communicate with each other. In this case, information on a purchased vehicle is obtained from the server of new car dealer 13.

In the used vehicle subscription service as well, as in the new car subscription service, user 53A uses user terminal 59A to enter selection of a shop, selection of a model, a grade, and an option of a vehicle to be used, selection of a contract period, and various types of information such as a name and a contact address of the user. Then, various types of information are transmitted and received among user terminal 59A, server 52, and business operator terminal 51. Used vehicle service information on used vehicle 50A is thus stored in server 52. FIG. 10 is a schematic diagram schematically showing used vehicle service information.

The used vehicle service information is stored for each of used vehicles 50A to 50E. The used vehicle service information includes a vehicle ID, vehicle information, flat-rate payment amount information, a contract period, and contractor information. The vehicle ID is set for each of vehicles 50A to 50E. The vehicle information includes each model name, a model year, vehicle record information, option information, grade information, and reconditioning record information. The vehicle record information includes accident information.

Figure 11:
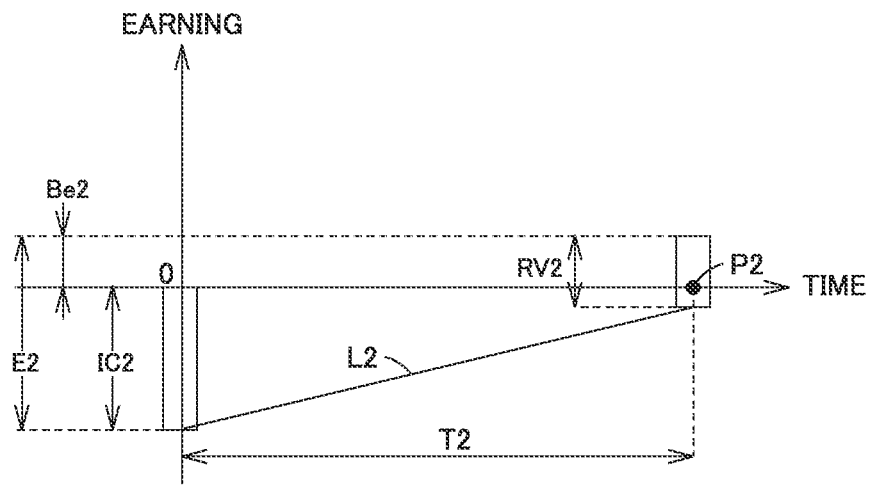
FIG. 11 shows a graph schematically showing an earnings structure of the subscription service for a used vehicle 50A.

FIG. 11 shows a graph schematically showing an earnings structure of the subscription service of used vehicle 50A. The ordinate in the graph represents earnings and the abscissa represents time. The origin "0" in the graph represents timing of start of the contract. "P2" in the graph represents timing of end of the contract and "T2" represents the contract period.

"IC2" in the graph represents an initial cost paid by service provider 14 when it provides the subscription service using used vehicle 50A. In an example where used vehicle 50A is purchased, initial cost IC2 includes a cost for purchasing used vehicle 50A, a maintenance cost, a troubleshooting cost, a voluntary insurance cost, and various tax expenses. In an example in which a vehicle used in the new car subscription service is used, initial cost IC2 includes residual value RV1 shown in FIG. 8, a voluntary insurance cost of used vehicle 50A, an expected repair cost, and various taxes.

A purchase cost in purchasing used vehicle 50A from retailer 17 or the like includes a cost for purchase of used vehicle 50A by retailer 17, a profit amount of retailer 17, and a repair cost for repair of used vehicle 50A. Therefore, use for the used vehicle subscription service, of a vehicle used in the new car subscription service can be less in initial cost IC2.

"L2" represents a condition line showing an earnings state when the subscription service using used vehicle 50A is provided. An initial value of condition line L2 is set to initial cost IC2.

Since user 53A monthly pays the flat-rate fee to service provider 14, condition line L2 increases with lapse of time.

A flat-rate fee FR2 in the used vehicle subscription service is lower than flat-rate fee FR1 in the new car subscription service. Therefore, condition line L2 is smaller in angle of inclination than condition line L1. A method of setting flat-rate fee FR2 will be described later.

A residual value RV2 refers to a residual value of used vehicle 50A at the time of contract expiration P2. Residual value RV2 represents a profit obtained at the time when used vehicle 50A is sold to any one of auction operator 16, retailer 17, and new car dealer 13 at the time of contract expiration P2.

"Sales E2" represents sales in the subscription service of used vehicle 50A. Specifically, sales E2 is the sum of a total amount of flat-rate fees periodically paid by user 53A to service provider 14 and residual value RV2. "Profit Be2" is a gross margin obtained by using used vehicle 50A in the subscription service and further selling used vehicle 50A. Profit Be2 is shown in an expression (2) below.

Profit $Be2$=Sales $E2$−Initial Cost $IC2$ (2)

Vehicle 40A that was used in the new car subscription service is defined as a "vehicle 40A1" for distinction from vehicle 40A which is a new car that has not been used in the used car subscription service.

Referring to FIG. 8, at the time of contract expiration P1 of the new car subscription service, service provider 14 can select any of a method of obtaining residual value RV1 by selling vehicle 40A1 at an auction or at retail and a method of using vehicle 40A1 in the used vehicle subscription service using vehicle 40A1 as shown in FIG. 11.

Figure 12:
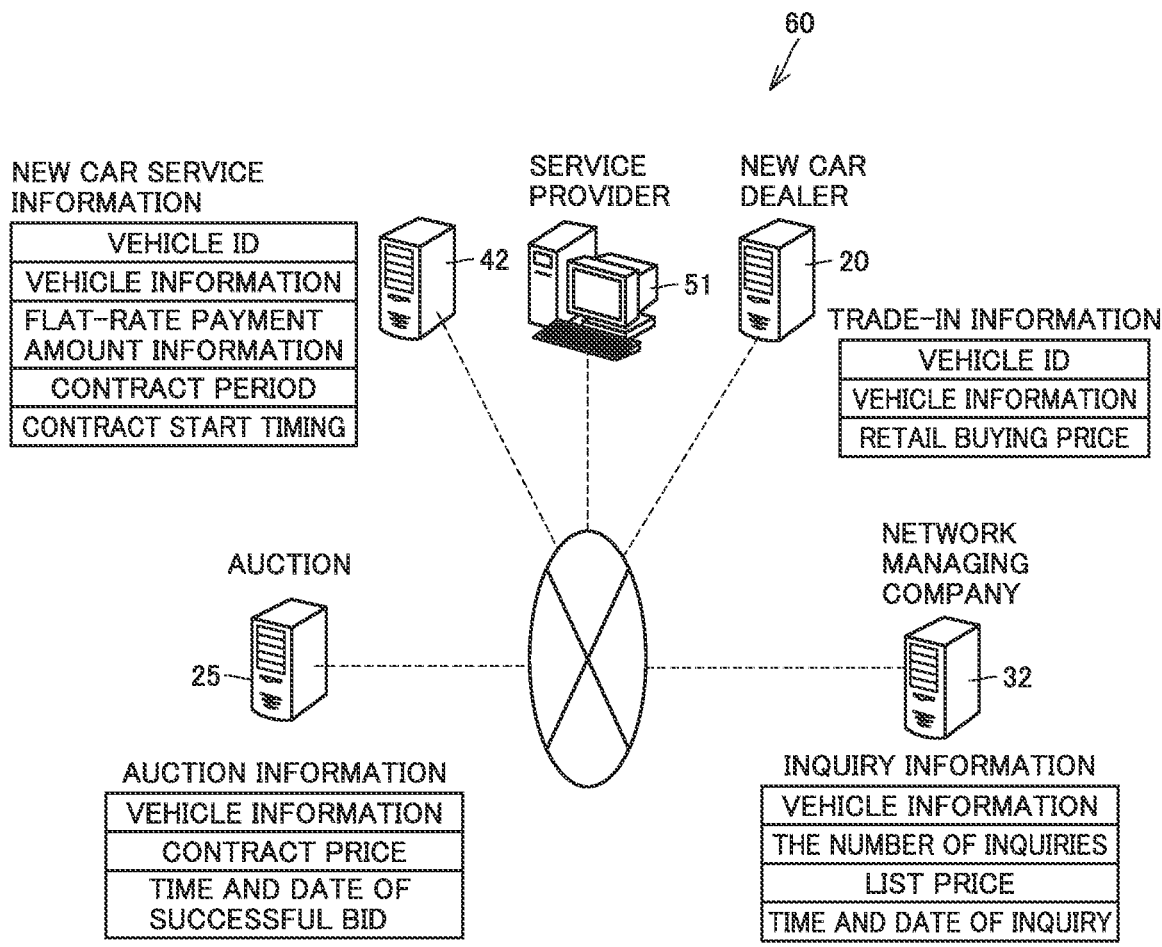
FIG. 12 is a schematic diagram schematically showing a proposal system 60.

Proposal system 60 is a system that proposes a method of using a used vehicle obtained by service provider 14, and proposes, when it proposes use of the used vehicle in the used vehicle subscription service, also a flat-rate fee in the service. FIG. 12 is a schematic diagram schematically showing proposal system 60.

Proposal system 60 includes business operator terminal 51, a server 20, server 25, server 32, and server 42. Business operator terminal 51 is configured to communicate with server 25, server 32, and server 42.

Server 20 is a server of new car dealer 13. New car dealer 13 runs also used vehicle trade-in business and used car sales business as described above.

Trade-in information in acceptance of trade-in of a used vehicle is stored in server 20. The trade-in information includes a vehicle ID for identifying a vehicle, vehicle information, and a retail buying price. The vehicle information in the trade-in information includes a model name, a model year, option information, grade information, reconditioning information, and travel distance information.

Business operator terminal 51 communicates with server 20, server 25, and server 32 through the Internet and the like. Business operator terminal 51 obtains the trade-in information from server 20. Business operator terminal 51 obtains auction information from server 25. Business operator terminal 51 obtains inquiry information from server 32 through the Internet.

Figure 13:
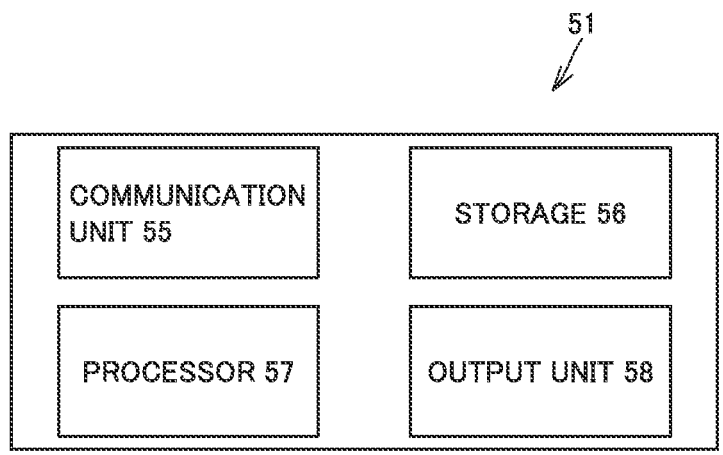
FIG. 13 is a functional block diagram of a business operator terminal 51.

FIG. 13 is a functional block diagram of business operator terminal 51. Business operator terminal 51 includes a communication unit 55, a storage 56, a processor 57, and an output unit 58.

Communication unit 55 obtains auction information from server 25 through the Internet or the like, and obtains inquiry information from server 32. Communication unit 55 obtains new car service information from server 42. The obtained auction information, inquiry information, and new car service information are stored in storage 56.

Processor 57 proposes a method of using a used vehicle obtained by service provider 14, and calculates, when it proposes use of the used vehicle for the used vehicle subscription service, also a flat-rate fee in the service. Output unit 58 refers to a display screen or the like on which a result of calculation by processor 57 is provided as output.

Figure 14:
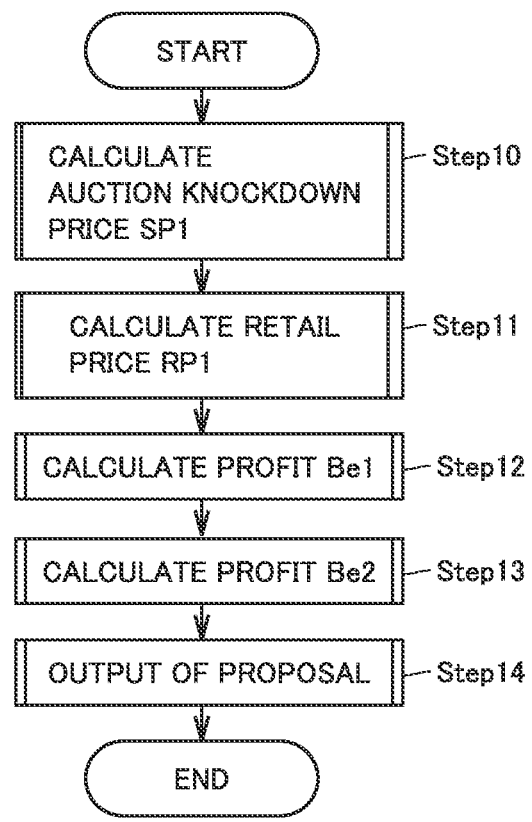
FIG. 14 is a flowchart showing a flow until a processor 57 proposes a method of using a vehicle 40A1.

FIG. 14 is a flowchart showing a flow until processor 57 proposes a method of using vehicle 40A1.

Processor 57 calculates an auction knockdown price SP1 of vehicle 40A1 (Step 10). Processor 57 calculates a retail buying price RP1 of vehicle 40A1 (Step 11). Then, processor 57 calculates profit Be1 based on auction knockdown price SP1 and retail buying price RP1 (Step 12).

Figure 15:
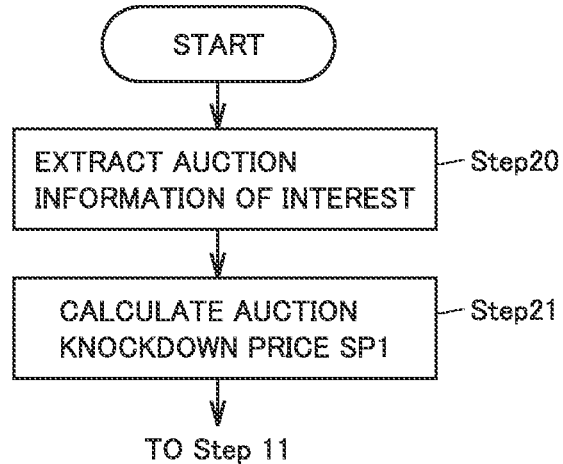
FIG. 15 is a flowchart of calculation of an auction knockdown price SP1.

Processor 57 calculates profit Be2 (Step 13). Then, processor 57 proposes a method of disposing of vehicle 40A1 based on profit Be1 and profit Be2 (Step 14). FIG. 15 is a flowchart of calculation of auction knockdown price SP1.

Processor 57 extracts auction information of interest of a vehicle the same in model and model year as vehicle 40A1 from auction information obtained from server 25 (Step 20). For example, the auction information includes the vehicle information, and the vehicle information includes model information and model year information. Then, processor 57 extracts auction information of a vehicle the same in model and model year as vehicle 40A1. The vehicle information of vehicle 40A1 is stored in storage 56. In extracting auction information, a vehicle incorporating options incorporated in vehicle 40A1 may be extracted based on option information as information other than the model and the model year.

Then, processor 57 calculates auction knockdown price SP1 based on the extracted auction information (Step 21). In this Step 21, auction knockdown price SP1 at the time of contract expiration P1 is calculated.

Figure 16:
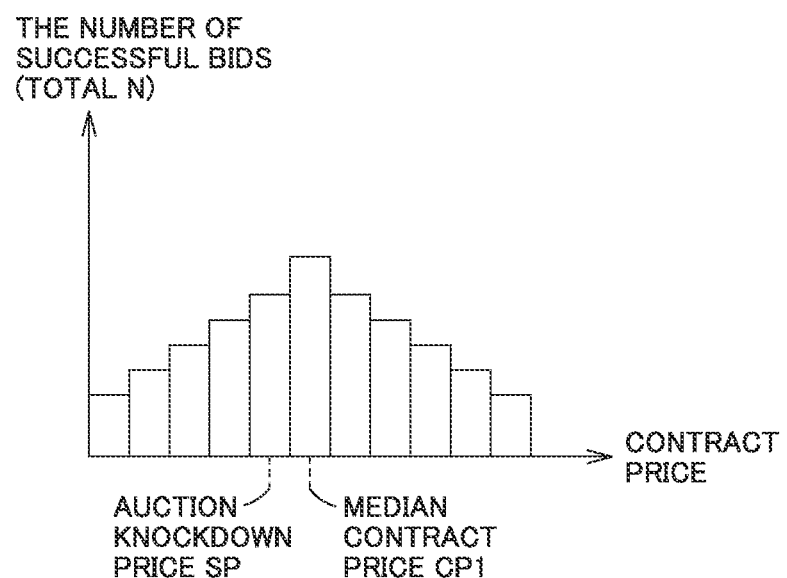
FIG. 16 shows a graph showing an exemplary distribution of contract prices of a model the same as that of vehicle 40A1.

FIG. 16 shows a graph showing an exemplary distribution of contract prices of a model the same as that of vehicle 40A1. The ordinate represents the number of successful bids and the abscissa represents a contract price. In an example shown in this FIG. 16, the total number of successful bids is denoted as N. A median contract price CP1 represents a median value of the contract prices. Processor 57 sets auction knockdown price SP such that successful bids at contract prices not lower than auction knockdown price SP occupy 80%-instances of the total extracted successful bids. Specifically, auction knockdown price SP is set such that 0.8×N successful bids are at contract prices not lower than auction knockdown price SP. In setting auction knockdown price SP1, an auction knockdown price is set such that at least 0.75×N and at most 0.85×N successful bids are at contract prices not lower than auction knockdown price SP1. Then, depending on a model of vehicle 40A1, a value to be set as auction knockdown price SP is varied. For example, a value closer to 0.75×N is set for a model larger in number (N) of successful bids (that is, auction knockdown price SP1 is higher). Thus, even when vehicle 40A1 is sold at an auction, higher possibility of unsuccessful bids can be suppressed, while setting of excessively low auction knockdown price SP can be suppressed.

A method of calculating auction knockdown price SP1 is not limited to the example as above, and the auction knockdown price may be expected in various methods.

When there is no repair or accident record for vehicle 40A1 based on repair information and accident information of vehicle 40A1 in Step 20, only auction information of a vehicle having no record of repair and accident is extracted from pieces of auction information obtained from server 25.

Referring back to FIG. 14, processor 57 calculates retail buying price RP1 (Step 11).

Various approaches can be adopted as a method of calculating retail buying price RP1. For example, in FIG. 12, a method of calculating the retail buying price based on trade-in information stored in server 20 or a method of calculating the retail buying price based on inquiry information stored in server 32 is available. Initially, when trade-in information is used, retail buying price RP1 can directly be obtained because the trade-in information includes the retail buying price. Specifically, retail buying prices of used vehicles the same in model, model year, and options as vehicle 40A1 are extracted from the trade-in information. Then, an average value of the extracted retail buying prices is defined as retail buying price RP1. A method of calculating retail buying price RP1 based on inquiry information will now be described with reference to FIG. 17 and the like.

Figure 17:
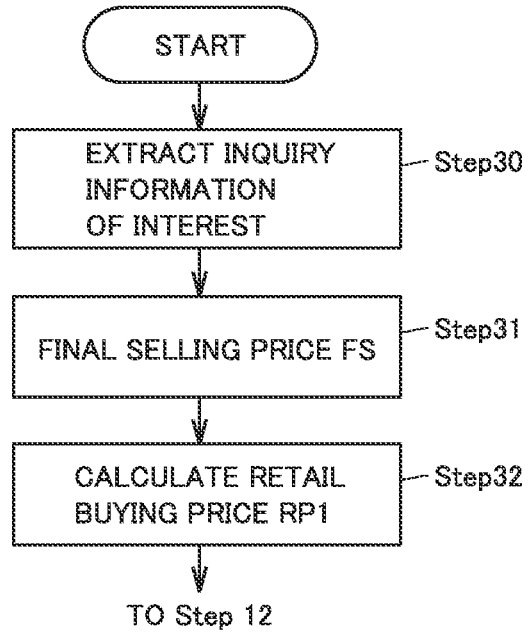
FIG. 17 is a flowchart of calculation of a retail buying price RP1.

FIG. 17 is a flowchart of calculation of retail buying price RP1. In this Step 11, retail buying price RP1 at the current time point (at the time of contract expiration P1) is calculated.

Processor 57 extracts inquiry information of interest of a vehicle the same in model and model year as vehicle 40A1 from inquiry information obtained from server 32 (Step 30). Specifically, inquiry information obtained from server 32 includes vehicle information, and this vehicle information includes model information and model year information. Then, processor 57 extracts inquiry information of a vehicle the same in model and model year as vehicle 40A1. The vehicle information of vehicle 40A1 is stored in storage 56.

Figure 18:
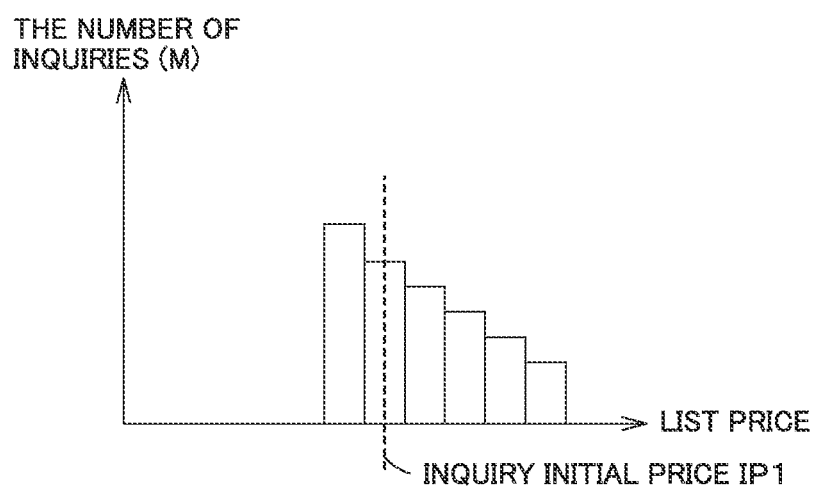
FIG. 18 shows a graph showing extracted inquiry information.

Processor 57 calculates a final selling price FS based on the extracted inquiry information (Step 31). FIG. 18 shows a graph showing extracted inquiry information. In this graph, the abscissa represents a list price on the web. In general, the number of inquiries tends to be larger with decrease in list price. Then, with the number of inquiries being denoted as M (cases), an inquiry initial price IP1 is set such that at least 75% and at most 85% of the number of inquiries M will be made at list prices not lower than inquiry initial price IP1. For example, inquiry initial price IP1 is set such that 0.8×M inquiries will be made at list prices not lower than that.

In general, the list price may be discounted, for example, before settlement of accounts of retailer 17. In such a case, retailer 17 may set the list price without any consideration of its profit. In order to calculate the list price at and above which inquiries will be made in a stable manner with such seasonal variation being excluded, inquiry initial price IP1 may be set to invite at least 75% and at most 85% of the number of inquiries M.

When inquiry initial price IP1 is set to invite less than 75% of the number of inquiries M, inquiry initial price IP1 is too high and final selling price FS or retail buying price RP1 which will be described later may not accurately be calculated. When inquiry initial price IP1 is set to invite more than 85% of the number of inquiries M, seasonal variation above may much be contained.

After inquiries are actually made, network managing company 31 is unable to know a specific purchase and sales price between retailer 17 and an individual purchaser. For example, even when retailer 17 makes a sales contract with an individual purchaser at a price discounted from the list price, network managing company 31 is unable to know such discount information.

Ten-percent discount from the list price is generally an upper limit. In general, an amount of discount is smaller as a model is more popular. Then, final selling price FS is set as in an expression (3) below.

$$\text{Final Selling Price } FS = \text{Inquiry Initial Price } IP1 \times \text{Coefficient } K5 \quad (3)$$

Coefficient K5 is set to a value not smaller than 0.9 and not larger than 1.0, and it is set to a value closer to 1.0 as the number of inquiries M is larger. A model popular in a used market is also popular in a new car market, and the number of sold new cars is large. Consequently, there are a large number of cars of the popular model also on the used market, and the number of inquiries M is also large. Since an amount of discount for the popular model tends to be smaller, the coefficient is set to be closer to 1.0 as the number of inquiries M is larger. Thus, final selling price FS at which retailer 17 sells vehicle 40A1 is calculated. Final selling price FS, on the other hand, refers to a price at which retailer 17 sells vehicle 40A1 to an individual consumer or the like, and it is different from a price at which retailer 17 buys vehicle 40A1. Then, retail buying price RP1 is calculated from final selling price FS.

Processor 57 calculates retail buying price RP1 (Step 32). When final selling price FS is defined as the price at which retailer 17 sells a used vehicle, processor 57 calculates retail buying price RP1 based on final selling price FS. Retail buying price RP1 refers to a price at which retailer 17 buys vehicle 40A1. Final selling price FS includes retail buying price RP1 and a gross margin of retailer 17. For example, 6% to 14% of retail buying price RP1 (an amount at which retailer 17 sells the used vehicle to an individual purchaser) is calculated as a gross margin of retailer 17. Therefore, retail buying price RP1 and final selling price FS satisfy relation in an expression (4) below.

$$\text{Retail Buying Price } RP1 \times \text{Coefficient } K6 = \text{Final Selling Price } FS \quad (4)$$

(Retail Buying Price RP1=Final Selling Price FS/Coefficient K6)

Coefficient K6 is set to a value not lower than 106% and not higher than 114%.

The gross margin is set based on a model year or the like of vehicle 40A1, and it is set to be smaller as the model year is older. In a retail market, the gross margin is set to be smaller for vehicles on the market in larger number than that for vehicles on the market in smaller number. For example, as the number of inquiries M is larger, a larger gross margin is set. In other words, since a popular model sells well, the gross margin of retailer 17 is often set to be larger.

Processor 57 thus calculates retail buying price RP1 at the time of contract expiration P1 of vehicle 40A1. When retail buying price RP1 can be calculated also based on trade-in information and inquiry information, an average value of the retail buying price calculated based on the trade-in information and the retail buying price calculated based on the inquiry information may be defined as retail buying price RP1.

Referring back to FIG. 14, at the time of contract expiration P1, processor 57 calculates profit Be1 at the time of selling of vehicle 40A1 (Step 12). Specifically, a value between retail buying price RP1 and auction knockdown price SP1 is set as residual value RV1. For example, residual value RV1 is set to a value intermediate between retail buying price RP1 and auction knockdown price SP1. For example, when neither of inquiry information and trade-in information can be obtained, auction knockdown price SP1 is defined as residual value RV1.

Residual value RV1 at the current time point (at the time of contract expiration P1) of vehicle 40A1, use of which ended in the new car subscription service, can thus be calculated. Then, profit Be1 can be calculated by subtracting a cost from the sum of the total amount of flat-rate fees FR1 obtained from the user during contract period T1 and residual value RV1. The cost includes a vehicle price for vehicle 40A, a voluntary insurance cost of vehicle 40A that was actually incurred, a repair cost and a maintenance cost, and various taxes.

Then, processor 57 calculates profit Be2 expected to be obtained when vehicle 40A1 is used in the used vehicle subscription service.

Figure 19:
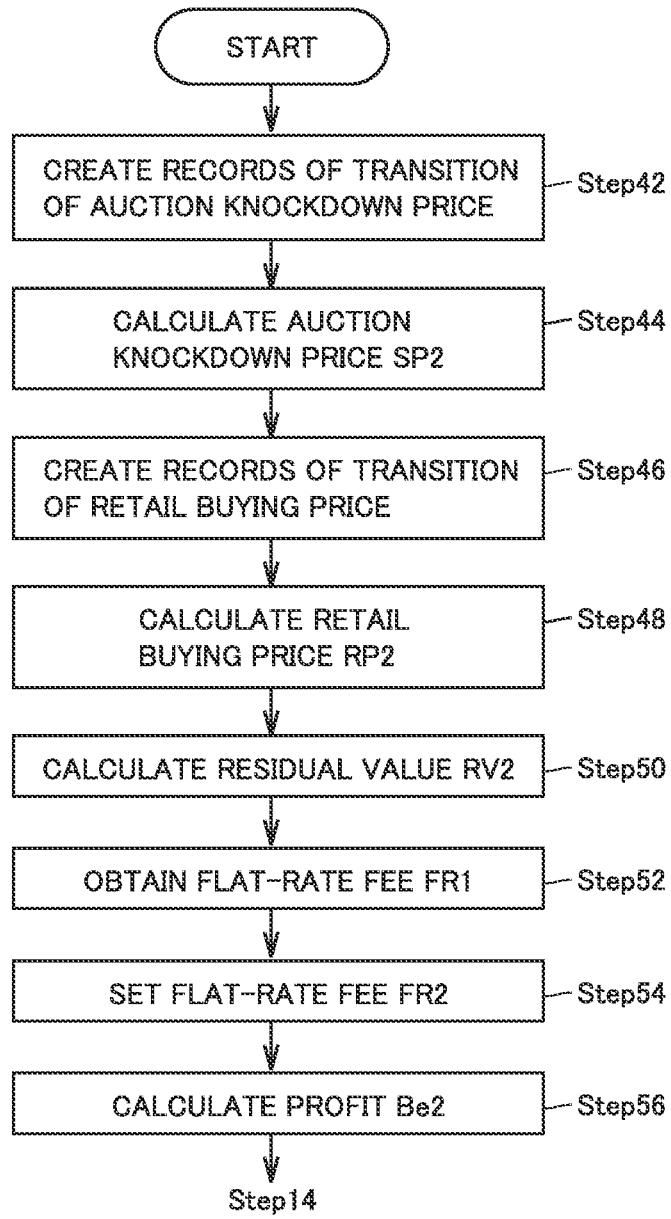
FIG. 19 is a flowchart of calculation of a profit Be2.

FIG. 19 is a flowchart of calculation of profit Be2. Processor 57 creates a history showing records over time of auction knockdown price SP (Step 42).

Specifically, processor 57 creates a history showing records over time of auction knockdown price SP for a vehicle the same in model and model year as vehicle 40A1. Without being limited only to the model and the model year alone, when vehicle 40A1 is equipped with options, auction information on a vehicle incorporating the options may be extracted and the history showing records over time of auction knockdown price SP may be created.

Auction information includes time and date of a successful bid. The auction information is divided into pieces based on a bid period lasting for a prescribed period. Then, the auction knockdown price is calculated for each bid period. A method of calculating the auction knockdown price is the same as the method described with reference to FIG. 16 and the like.

Figure 20:
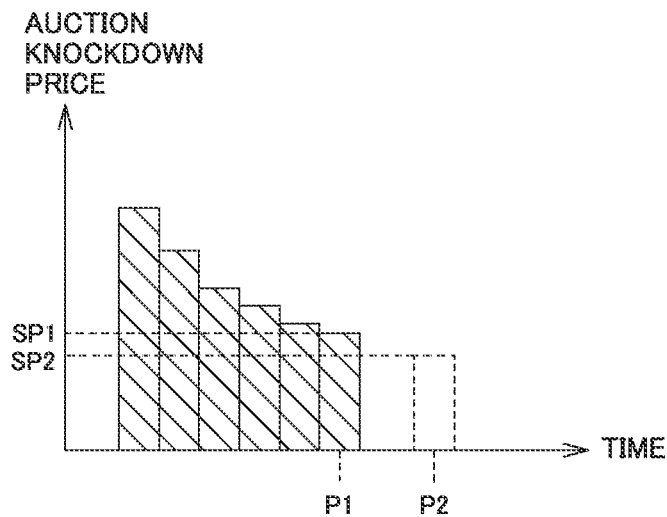
FIG. 20 shows a graph showing a history of records over time of an auction knockdown price SP.

FIG. 20 shows a graph showing a history of records over time of auction knockdown price SP. The ordinate in the graph represents auction knockdown price SP. The abscissa represents time. It can be seen in this graph that auction knockdown price SP decreases with lapse of time.

In the graph, auction information is shown up to auction knockdown price SP until the current time point (at the time of contract expiration P1).

Then, processor 57 calculates an auction knockdown price SP2 at the time of contract expiration P2 (Step 44). For example, in FIG. 20, by first-order approximation or quadrature approximation of auction knockdown price SP until contract expiration P1 at each time point, auction knockdown price SP2 at the time of contract expiration P2 is calculated. Various methods can be adopted as a method of calculating auction knockdown price SP2.

Processor 57 thus predicts auction knockdown price SP2 after vehicle 40A1 is used in the used vehicle subscription service.

Processor 57 creates a history showing transition over time of a retail buying price of a vehicle the same in model and model year as vehicle 40A1 (Step 46).

Inquiry information includes information representing time and date of an inquiry. Processor 57 calculates retail buying price RP based on an inquiry price IP in each piece of inquiry information.

Figure 21:
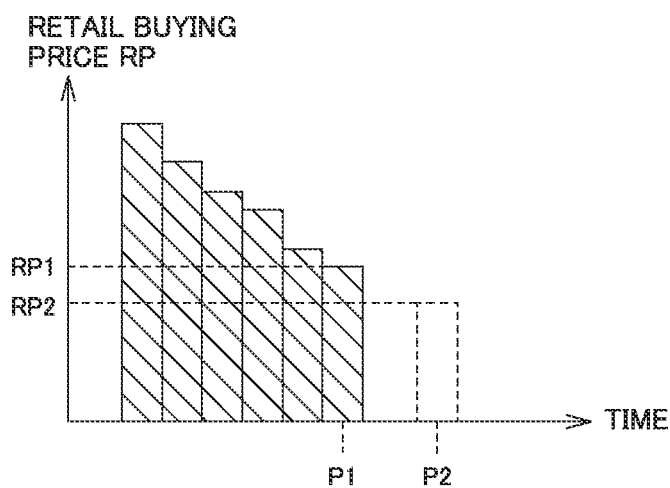
FIG. 21 shows a graph showing transition over time of a retail buying price of a vehicle the same in model and model year as vehicle 40A1.

FIG. 21 shows a graph showing transition over time of a retail buying price of a vehicle the same in model and model year as vehicle 40A1.

In this graph, the ordinate represents the retail buying price and the abscissa represents time. Since inquiry information until the current time point (contract expiration P1) is stored in storage 56, the graph until the time of contract expiration P1 is shown. A method of calculating the retail buying price based on inquiry information is the same as the calculation method with reference to FIG. 18.

Processor 57 calculates a retail buying price RP2 at the time of contract expiration P2 based on transition over time of the retail buying price (Step 48).

For example, by first-order approximation or quadrature approximation of retail buying price RP until contract expiration P1, retail buying price RP2 at the time of contract expiration P2 is calculated. The method of calculating retail buying price RP2 is not limited to the method above.

Then, as shown in FIG. 19, processor 57 calculates residual value RV2 (Step 50). Specifically, residual value RV2 is set to a value between retail buying price RP2 and auction knockdown price SP2. For example, residual value RV2 is set to a value intermediate between retail buying price RP2 and auction knockdown price SP2.

Then, processor 57 obtains through communication unit (obtaining unit) 55, flat-rate fee FR1 in a case in which new cars identical in model and model year to vehicle 40A1 are used in the new car subscription service (Step 52).

Specifically, communication unit 55 obtains new car service information from server 42. This new car service information includes vehicle information, flat-rate payment amount information, a contract period, and contract start timing. Flat-rate fee FR1 is shown in the flat-rate payment amount information. Then, flat-rate fee FR1 for contract period T1 the same as contract period T2 in using vehicle 40A1 in the used vehicle subscription service is extracted. Then, processor 57 sets (calculates) a flat-rate fee to monthly be paid by a user in the case in which vehicle 40A1 is used in the used vehicle subscription service (Step 54).

A flat-rate fee to be paid by a user when vehicle 40A is used in the new car subscription service is defined as flat-rate fee FR1, and a flat-rate fee to be paid by a user when vehicle 40A1 is used in the used vehicle subscription service is defined as flat-rate fee FR2. Flat-rate fee FR1 and flat-rate fee FR2 satisfy an expression (5) below. A coefficient A has a value larger than 0 and smaller than 1.

$$\text{Flat-Rate Fee } FR1 \times \text{Coefficient } A = \text{Flat-Rate Fee } FR2 \tag{5}$$

Flat-rate fee FR1 is flat-rate fee FR1 set for the new car subscription service, for vehicle 40A the same in model and model year as vehicle 40A1 to be used in the used vehicle subscription service. When vehicle 40A1 incorporates options, flat-rate fee FR1 is flat-rate fee FR1 for vehicle 40A incorporating options the same as the options. Coefficient A not smaller than 0.4 and not larger than 0.7 is set. When coefficient A is larger than 0.7, a difference between flat-rate fee FR1 and flat-rate fee FR2 becomes smaller and a user is less likely to find a financial benefit in using the used vehicle subscription service. When coefficient A smaller than 0.4 is set, service provider 14 is less likely to secure a profit even when the service provider sells vehicle 40A at the time of contract expiration P2.

Coefficient A may be set, for example, based on a ratio between residual value RV1 at the current time point of vehicle 40A1 and residual value RV2 after contract period T2. In a specific example, coefficient A may be set as shown in an expression (6) below. Either higher one of auction knockdown price SP1 and retail buying price RP1 is selected as residual value RV1.

In the expression (6) below, a model smaller in amount of decrease in residual value even after lapse of time is popular to users. In this case, according to the expression (6) below, production of a difference between residual value RV1 and residual value RV2 is less likely, coefficient A is set to a value close to 1, and flat-rate fee FR2 is close to flat-rate fee FR1. On the other hand, since the model is popular to users, even though a vehicle is a used vehicle, demand can be expected.

$$\text{Coefficient } A = \text{Residual Value RV2/Residual Value RV1} \quad (6)$$

Then, in FIG. 19, profit Be2 is calculated (Step 56). In FIG. 11, initial cost IC2 is calculated from the sum of residual value RV1, the voluntary insurance cost of used vehicle 50A, a predicted repair cost, and various taxes.

The angle of inclination (flat-rate fee FR2) of condition line L2 has been calculated, and residual value RV2 has been calculated in Step 50. Therefore, profit Be2 can be predicted.

Then, in FIG. 14, processor 57 provides output of a proposal for a method of using vehicle 40A1 (Step 14).

Figure 22:
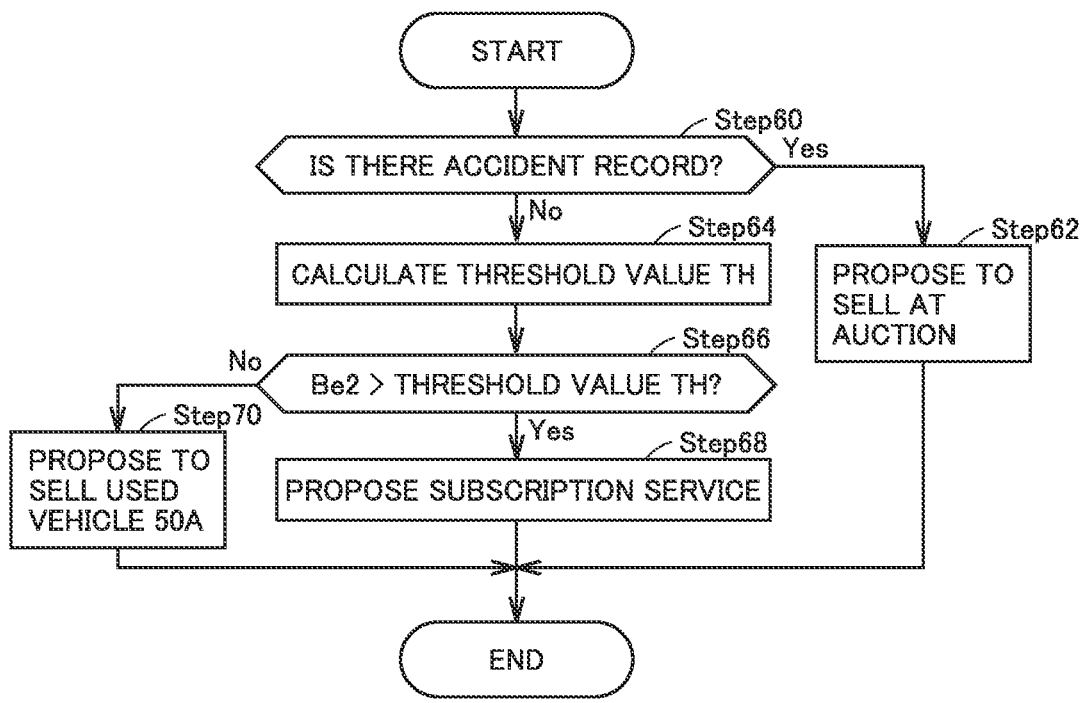
FIG. 22 is a flowchart showing a flow for output of a proposal.

FIG. 22 is a flowchart showing a flow for output of a proposal. Processor 57 determines whether or not there is an accident record based on the vehicle information of vehicle 40A1 (Step 60). When there is an accident record for vehicle 40A1, it is inappropriate as a vehicle for the used vehicle subscription service.

When processor 57 determines that there is an accident record for vehicle 40A1 (Yes in Step 60), processor 57 proposes to sell vehicle 40A1 at an auction (Step 62) because the vehicle can be sold earlier at an auction than at retail. Thus, a cost required for storing vehicle 40A1 can be reduced.

When processor 57 determines that there is no accident record for vehicle 40A1, it calculates a threshold value TH (Step 64). For example, a value calculated by subtracting a prescribed value K1 from profit Be1 at the current time point (contract expiration P1) is defined as threshold value TH.

Prescribed value K1 is set based on an economic value of information obtained from a user during contract period T2. For example, information on problems and improvements in connection with the subscription service and trends of user's ideas can be obtained through inquiries and questionnaires from users during contract period T2. Such direct information from the users is a source of information for preparing a type of a vehicle or for preparing a vehicle incorporating specific options. Thus, combination of services and merchandises that service provider 14 has never thought of may be created based on information from the users.

Information obtained from a user is valuable for providing a new service. Larger prescribed value K1 is set as contract period T2 is longer. As contract period T2 is longer, more information is obtained from the user.

For example, larger prescribed value K1 may be set as the number of vehicles sold on auction markets and retail markets is smaller. As the number of vehicles sold on the markets is smaller, there are fewer opportunities for obtaining information such as feedback from users about the vehicles, and there is possibility of obtaining valuable information. Processor 57 can obtain the number of vehicles sold on the auction markets and the retail markets from auction information and inquiry information.

Various setting methods can be adopted as a method of setting threshold value TH. For example, threshold value TH may be calculated by multiplying profit Be1 by a coefficient K2 not larger than 1 such as a coefficient not smaller than 0.6 and not larger than 0.95. For example, smaller coefficient K2 is set as the number of vehicles sold on the auction markets and the retail markets is smaller. A new service provided based on "valuable information obtained from users" as above leads to reduction of user's complaints. A specific method of deriving an economic value of "valuable information obtained from users" will now be described with reference to a model shown in FIG. 23 and the like.

Figure 23:
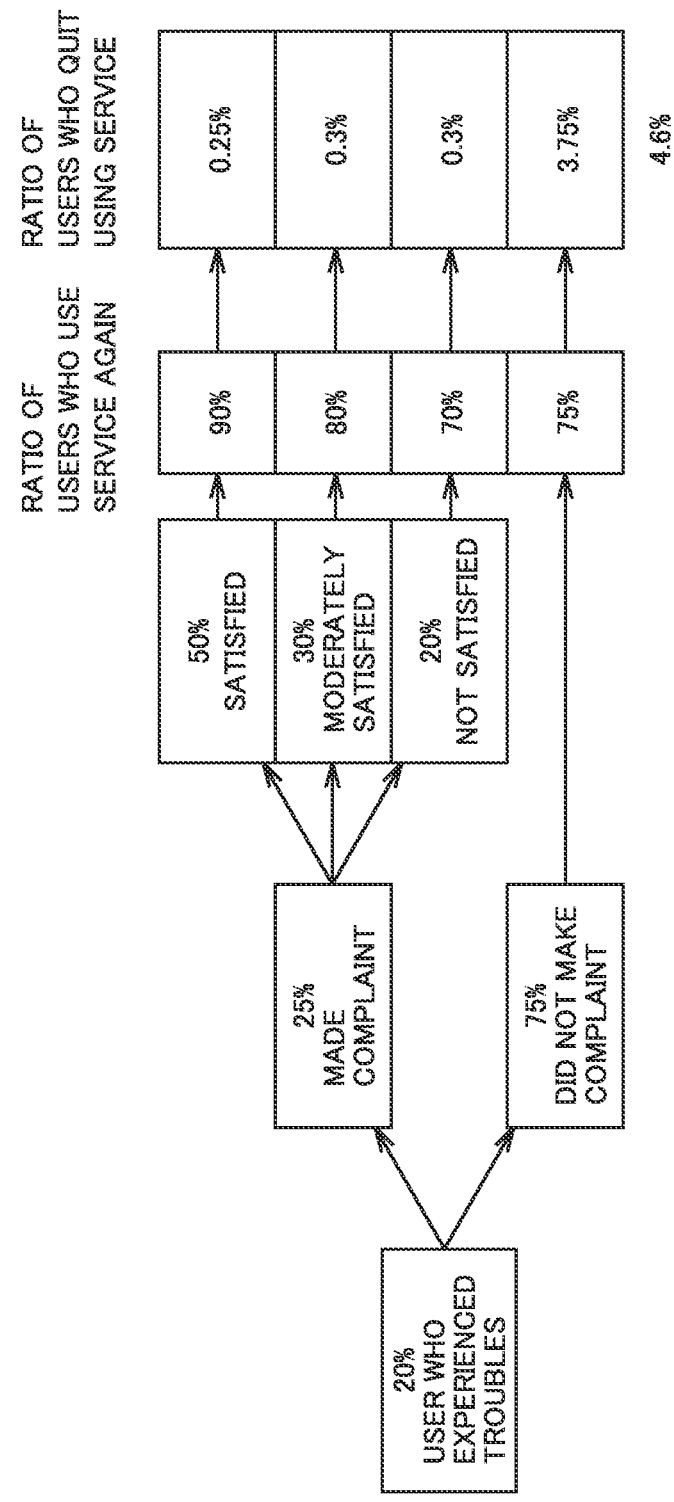
FIG. 23 shows a model for calculation of a ratio of users who experienced troubles and quit using a service.

FIG. 23 shows a model for calculation of a ratio of users who experienced troubles and quit using a service. In FIG. 23, it is assumed that 20% of all users experienced troubles as a result of use of the subscription service.

Then, it is assumed that 25% of the users who experienced troubles actually contacted service provider 14 and 75% of the users did not contact service provider 14.

It is assumed that 50% of the users who made a complaint to service provider 14 is satisfied with the subscription service, 30% of them is moderately satisfied therewith, and 20% of them is not satisfied therewith. Then, it is assumed that 90% of the users who are "satisfied" uses the subscription service again and 10% of them quits using the service.

Similarly, it is assumed that 80% of the users who are "moderately satisfied" uses the subscription service again and 20% of them quits using the service. It is assumed that 70% of the users who are "not satisfied" uses the subscription service again and 30% of them quits using the service.

It is assumed that 75% of the users who experienced troubles and did not contact service provider 14 uses the subscription service again and 25% of them quits using the service.

Consequently, in the model shown in FIG. 23, 4.6% of all users will not use the subscription service.

On the other hand, by securing an opportunity to adopt user's opinions, the model and the options of the vehicle provided in the subscription service and other service contents can be improved and users who quit using the subscription service can be reduced.

Figure 24:
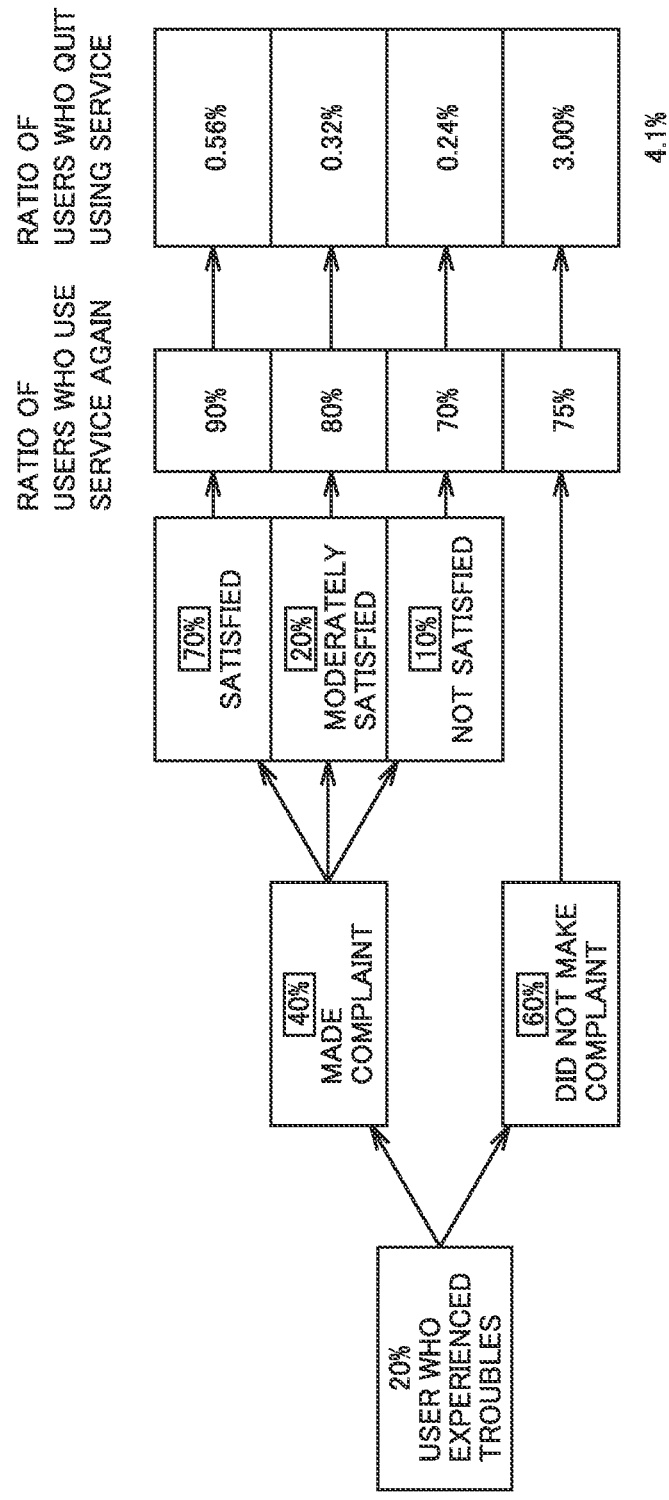
FIG. 24 is a schematic diagram showing a model after service contents have been improved from a state of the model shown in FIG. 23.

FIG. 24 is a schematic diagram showing a model after service contents have been improved from a state of the model shown in FIG. 23.

The model shown in this FIG. 24 is, for example, a model in a state that opportunities of contact with users increased as a result of having the users use the used vehicle subscription service and furthermore various improvements in the subscription service were made based on contents of complaints from the users.

In this FIG. 24, as a result of increase in opportunities of contact with the users, 40% of the users who experienced troubles contacted service provider 14.

Seventy percents of the users who made complaints to service provider 14 are satisfied with the subscription service, 20% of them is moderately satisfied therewith, and 10% of them is not satisfied therewith.

Then, in the model shown in FIG. 24, 4.1% of all users will not use the subscription service. Thus, 0.5% of the all users will use the subscription service again without quitting using the subscription service. In other words, loss by 0.5% of the total sales of the subscription service can be recovered.

Figure 25:
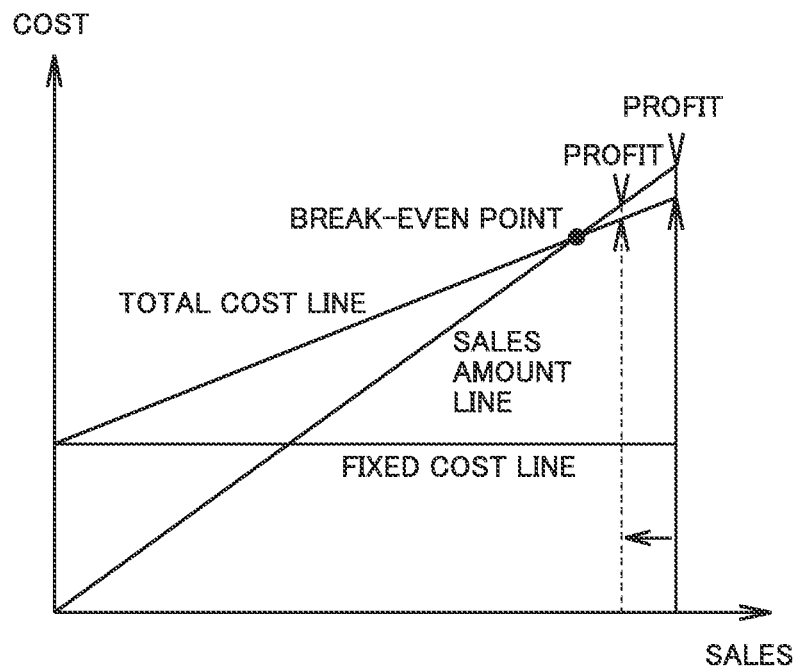
FIG. 25 shows a graph schematically showing a break-even point and the like of the subscription service.

FIG. 25 shows a graph schematically showing a break-even point or the like of the subscription service. As is clear also from this graph, a break-even point in the subscription service is located at a high position. Therefore, lowering in sales, for example, by 0.5% greatly reduces the profit. Though complaints from the users relate to the used vehicle subscription service, the complaints can be used also for improvement of the new car subscription service. Therefore, a line showing the sales shown in FIG. 25 represents the total of sales E1 in the subscription service using vehicle 40A and sales E2 in the used vehicle subscription service using vehicle 40A1.

Though an example in which the loss accounts for 0.5% of the total sales is described with reference to the model shown in FIGS. 23 and 24, the economic value of "valuable information obtained from users" is varied within a range from 0.4% to 0.6% of the total sales. Therefore, threshold value TH is set to satisfy an expression (7) below.

$(E1+E2) \times 0.004$ threshold value $TH \leq (E1+E2) \times 0.006$     (7)

Threshold value TH can be expressed as in an expression (8) below by substituting (sales E1+sales E2) in the expression above with profit Be1.

Profit $Be1 \times 0.6$ threshold value $TH$ profit $Be1 \times 0.95$     (8)

Then, in the present embodiment, threshold value TH is calculated by multiplying profit Be1 by coefficient K2 not larger than 1 such as a coefficient not smaller than 0.6 and not larger than 0.95.

When coefficient K2 is smaller than 0.6, the value of information from the users is excessively high.

When coefficient K2 is larger than 0.95, the value of information from the users is excessively low.

Threshold value TH may be calculated by multiplying profit Be1 by coefficient K2 not larger than 1 such as a coefficient not smaller than 0.6 and not larger than 0.95, or by multiplying profit Be1 by coefficient K2 not larger than 1 such as a coefficient not smaller than 0.7 and not larger than 0.9.

Then, processor 57 determines whether or not profit Be2 is larger than threshold value TH (Step 66). When profit Be2 is larger than threshold value TH, processor 57 proposes to use vehicle 40A1 in the used vehicle subscription service (Step 68), and when profit Be2 is equal to or smaller than threshold value TH, it proposes to sell vehicle 40A1 (Step 70).

Thus, proposal system 60 proposes a method of using vehicle 40A1 in consideration of the economic value of information obtained from the users by using vehicle 40A1 in the used vehicle subscription service. When the proposal system proposes use in the used vehicle subscription service in Step 68, processor 57 has output unit 58 provide an output including flat-rate fee FR2 calculated in Step 54. Thus, when vehicle 40A1 which is a used vehicle is used in the used vehicle subscription service, proposal system 60 also functions as a system that calculates flat-rate fee FR2. Residual value RV2 and the like at the time of contract expiration P2 may also be provided as output together.

When sale of vehicle 40A1 is proposed in Step 70 and a retail buying price RP3 is higher than auction knockdown price SP2, processor 57 proposes to sell used vehicle 50A at retail. On the other hand, when an auction knockdown price SP3 is higher than retail buying price RP3, processor 57 proposes to sell used vehicle 50A at an auction.

Second Embodiment

A proposal system 60A according to a second embodiment will be described with reference to FIG. 26 and the like. Providing the subscription service again with the use of vehicles that were used in the used vehicle subscription service is referred to as a "used vehicle re-subscription service." Used vehicle 50A that was used in the used vehicle subscription service is defined as a "used vehicle 50A1."

Proposal system 60A according to the present second embodiment is a system that proposes a method of using used vehicle 50A1, and it proposes a method of using used vehicle 50A1 in consideration of an economic value of information obtained when used vehicle 50A1 is used in the used vehicle re-subscription service.

Figure 26:
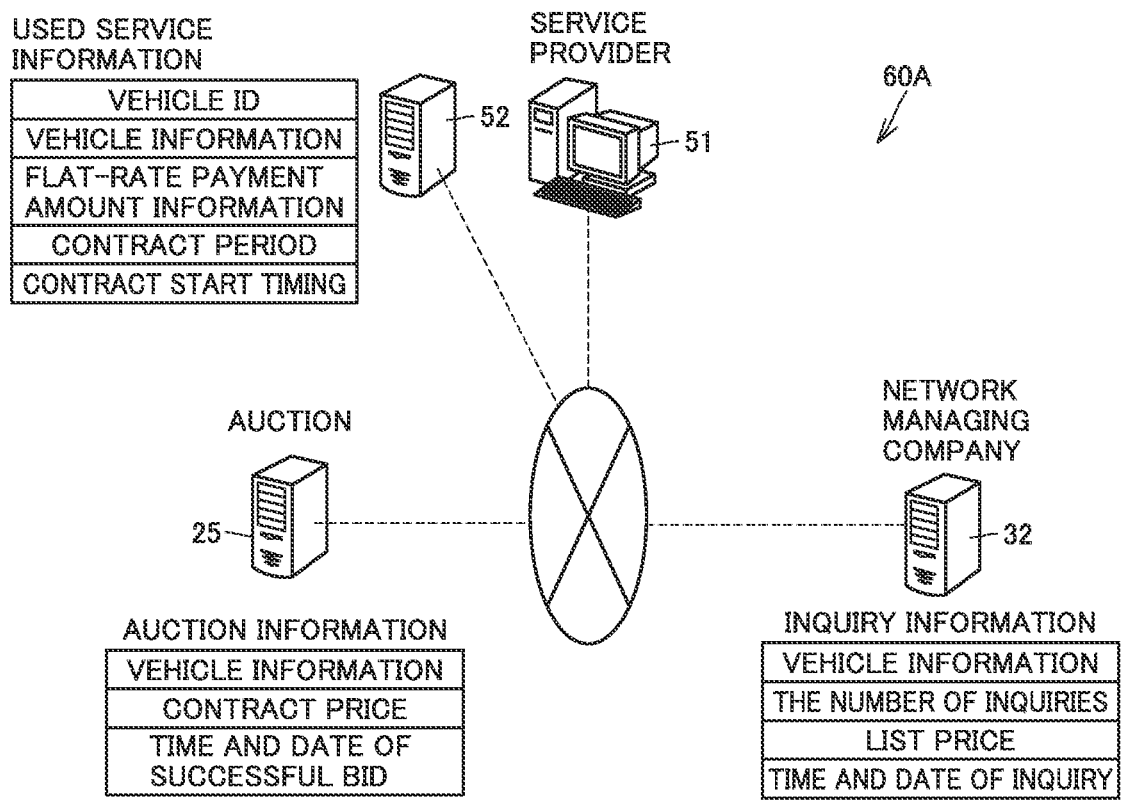
FIG. 26 is a schematic diagram showing a proposal system 60A.

FIG. 26 is a schematic diagram showing proposal system 60A. Proposal system 60A includes business operator terminal 51, server 52, server 25, and server 32.

Then, business operator terminal 51 is configured to communicate with server 52, server 25, and server 32. Business operator terminal 51 obtains used vehicle service information from server 52. Business operator terminal 51 obtains auction information from server 25 and obtains inquiry information from server 32.

Figure 27:
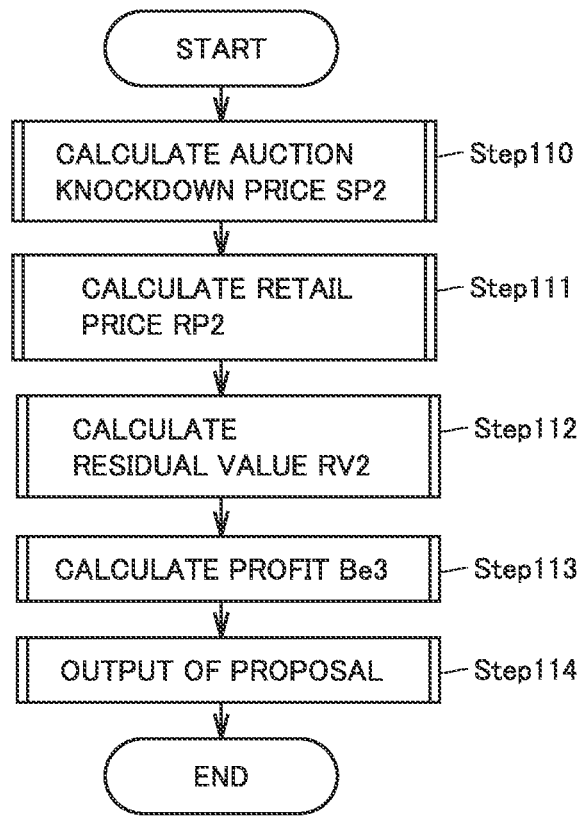
FIG. 27 is a flowchart showing a proposal flow in which proposal system 60A proposes a method of using a used vehicle 50A1.

FIG. 27 is a flowchart showing a proposal flow in which proposal system 60A proposes a method of using used vehicle 50A1.

Business operator terminal 51 calculates auction knockdown price SP2 based on the auction information (Step 110). In the present embodiment, the current time point corresponds to the time of contract expiration P2 at which the used vehicle subscription service expires. Therefore, business operator terminal 51 can obtain the auction information until contract expiration P2. Then, auction knockdown price SP2 can be calculated based on the auction information.

Business operator terminal 51 calculates retail buying price RP2 (Step 111). Business operator terminal 51 can obtain retail information until contract expiration P2. Then, business operator terminal 51 calculates retail buying price RP2 at the current time point (contract expiration P2) based on the obtained retail information.

Business operator terminal 51 calculates residual value RV2 (Step 112). Residual value RV2 is set to a value between auction knockdown price SP2 and retail buying price RP2. For example, residual value RV2 is set to a value intermediate between auction knockdown price SP2 and retail buying price RP2.

Figure 28:
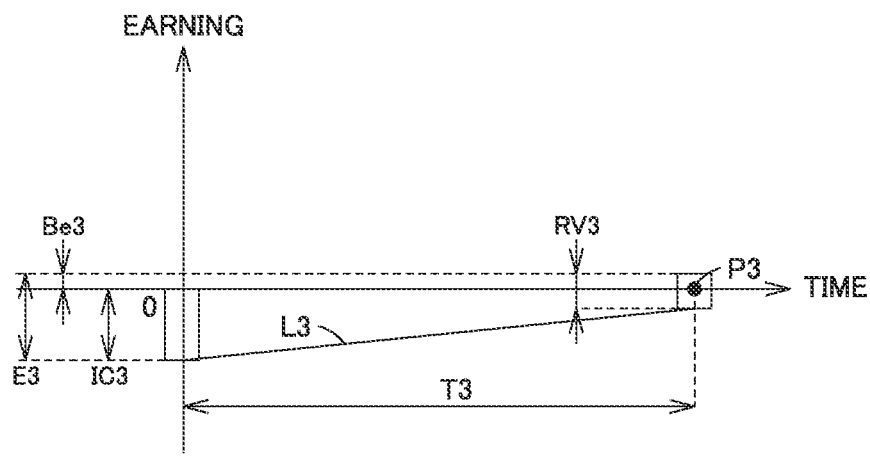
FIG. 28 shows a graph showing an earnings state when used vehicle 50A1 is used in a used vehicle re-subscription service.

Then, a profit Be3 in the used vehicle re-subscription service is calculated (Step 113). FIG. 28 shows a graph showing an earnings state when used vehicle 50A1 is used in the used vehicle re-subscription service.

The ordinate in the graph represents earnings. The abscissa represents time. In this graph, the current time point corresponds to the time of contract expiration P2 of the used vehicle re-subscription service.

"P3" represents timing of expiration of the contract of the used vehicle re-subscription service. "T3" represents a contract period of the used vehicle re-subscription service. "IC3" represents an initial cost. Initial cost IC3 is calculated from the sum of residual value RV2, the voluntary insurance cost of a used vehicle 50A2, a predicted repair cost, and various taxes.

"L3" represents an earnings state of the used vehicle re-subscription service. Since a flat-rate fee FR3 is periodically paid to service provider 14, a condition line L3 increases with lapse of time. A value smaller than flat-rate fee FR2 is set as flat-rate fee FR3. A residual value RV3 is a residual value of used vehicle 50A2 at the time of contract expiration P3. "E3" represents the sales in the used vehicle re-subscription service and can be calculated from flat-rate fee FR3, contract period T3, and residual value RV3. "Be3" represents a profit of service provider 14. Then, profit Be3 can be calculated from sales E3 and initial cost IC3.

Figure 29:
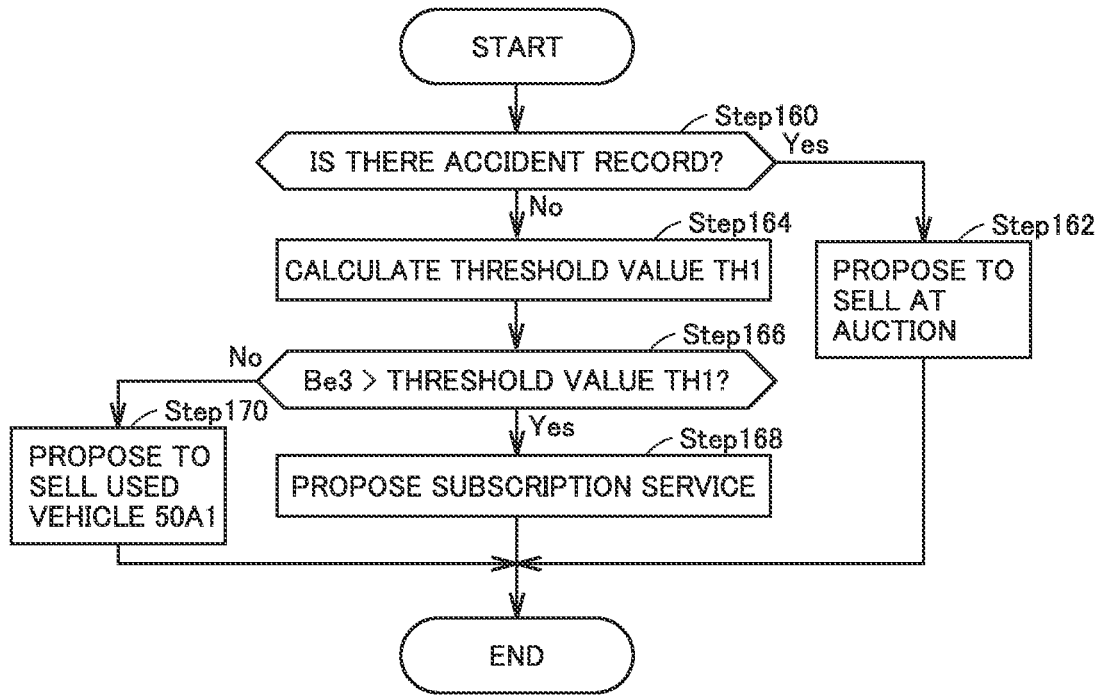
FIG. 29 is a flowchart showing a flow for output of a proposal.

FIG. 29 is a flowchart showing a flow for output of a proposal. Processor 57 determines whether or not there is an accident record based on the vehicle information of used vehicle 50A1 (Step 160). When there is an accident record for used vehicle 50A1, it is inappropriate as a vehicle for the used vehicle re-subscription service.

When processor 57 determines that there is an accident record for used vehicle 50A1 (Yes in Step 160), processor 57 proposes to sell used vehicle 50A1 at an auction (Step 162)

because the used vehicle can be sold earlier at an auction than at retail. Thus, cost required for storing used vehicle 50A1 can be reduced.

When processor 57 determines that there is no accident record for used vehicle 50A1, it calculates a threshold value TH1 (Step 164). For example, a value calculated by subtracting a prescribed value K11 from profit Be2 that can be finalized by selling used vehicle 50A1 at the current time point (contract expiration P2) is defined as threshold value TH1.

Prescribed value K11 is set based on an economic value of information obtained from a user during contract period T3. A value smaller than "prescribed value K1" in the first embodiment is set as prescribed value K11. For example, various types of information such as a hobby of a user can be obtained during contract period T3. Such information is valuable for providing a new service. Larger prescribed value K11 is set as contract period T3 is longer. This is because, as contract period T3 is longer, more information is obtained from the users.

For example, larger prescribed value K11 may be set as the number of vehicles sold on the auction markets and the retail markets is smaller. As the number of vehicles sold on the markets is smaller, there are fewer opportunities for obtaining information such as feedback from users about the vehicles, and there is possibility of obtaining valuable information. Processor 57 can obtain the number of vehicles sold on the auction markets and the retail markets from auction information and inquiry information.

Various setting methods can be adopted as a method of setting threshold value TH1. For example, threshold value TH1 may be calculated by multiplying profit Be2 by a coefficient K12 not larger than 1 such as a coefficient not smaller than 0.6 and not larger than 0.95. For example, coefficient K12 is set to be smaller as the number of vehicles sold on the auction markets and the retail markets is smaller. A value larger than coefficient K2 is set as coefficient K12.

Then, processor 57 determines whether or not profit Be3 is larger than threshold value TH1 (Step 166). When profit Be3 is larger than threshold value TH1, processor 57 proposes to use used vehicle 50A1 in the used vehicle subscription service (Step 168), and when profit Be3 is equal to or smaller than threshold value TH1, it proposes to sell used vehicle 50A1 (Step 170).

Thus, proposal system 60A proposes the method of using used vehicle 50A1 in consideration of information obtained from users by using used vehicle 50A1 in the used vehicle re-subscription service.

When the sale of used vehicle 50A1 is proposed in Step 170 and retail buying price RP3 is higher than auction knockdown price SP2, processor 57 proposes to sell used vehicle 50A at retail. On the other hand, when auction knockdown price SP3 is higher than retail buying price RP3, processor 57 proposes to sell used vehicle 50A at an auction. Functions of proposal system 60A may be incorporated in proposal system 60.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A proposal system comprising:
   a server in which information on a new car subscription service is stored;
   a communication unit that obtains information on a first flat-rate fee for a model identical to a model of a used vehicle from the server via a network; and
   a processor that calculates a second flat-rate fee to be lower than the first flat-rate fee, wherein
   the new car subscription service is a new car subscription service in which a user is entitled to use a new car by periodically paying the first flat-rate fee, and
   a used vehicle subscription service is provided in which a user is entitled to use a used vehicle by periodically paying the second flat-rate fee,
   an auction system that holds an auction of an auction used vehicle includes an auction server in which auction information on the auction used vehicle is stored, wherein the auction information includes a contract price and a number of successful bids,
   wherein the communication unit obtains the auction information from the auction server,
   wherein the processor is configured to:
      set a difference between the second flat-rate fee and the first flat-rate fee to be smaller as an amount of decrease which is decrease of a residual value of the used vehicle with lapse of time is smaller,
      with a vehicle that was used in the new car subscription service being defined as the used vehicle, calculate a residual value of the used vehicle at a current time point and a residual value of the used vehicle after lapse of a prescribed period since the current time point, based on an auction knockdown price at time of sale of the used vehicle at an auction and a retail buying price at time of sale of the used vehicle at retail, and
      set the auction knockdown price such that successful bids at contract prices not lower than the auction knockdown price occupy 75%-85% of the number of successful bids, and change the auction knockdown price to be higher as the number of successful bids is larger.

* * * * *